(12) United States Patent
Jeon et al.

(10) Patent No.: US 9,830,010 B2
(45) Date of Patent: Nov. 28, 2017

(54) MOBILE TERMINAL

(71) Applicant: LG ELECTRONICS INC., Seoul (KR)

(72) Inventors: Youjin Jeon, Seoul (KR); Byoungzoo Jeong, Seoul (KR); Suyoung Lee, Seoul (KR); Juhyun Lee, Seoul (KR); Jeyeol Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/053,086

(22) Filed: Feb. 25, 2016

(65) Prior Publication Data
US 2017/0010727 A1   Jan. 12, 2017

(30) Foreign Application Priority Data
Jul. 10, 2015  (KR) .................. 10-2015-0098321

(51) Int. Cl.
    G06F 3/041    (2006.01)
    G06F 3/0488   (2013.01)
    G06F 3/01     (2006.01)
    H04M 1/02     (2006.01)

(52) U.S. Cl.
    CPC .......... G06F 3/0414 (2013.01); G06F 3/016 (2013.01); G06F 3/0412 (2013.01); G06F 3/0488 (2013.01); H04M 1/0295 (2013.01)

(58) Field of Classification Search
    CPC ...... G06F 3/0414; G06F 3/016; G06F 3/0412; G06F 3/0488
    See application file for complete search history.

(56) References Cited

U.S. PATENT DOCUMENTS

| | | | |
|---|---|---|---|
| 2009/0117943 A1 | 5/2009 | Lee et al. | |
| 2014/0253478 A1* | 9/2014 | Jeong | G06F 3/016 345/173 |
| 2015/0138101 A1* | 5/2015 | Park | G06F 3/0412 345/173 |
| 2015/0317053 A1* | 11/2015 | Baek | G06F 3/0488 715/765 |
| 2016/0150207 A1* | 5/2016 | Zheng | H04N 9/806 386/227 |
| 2016/0269634 A1* | 9/2016 | Xu | H04N 5/23229 |
| 2016/0291731 A1* | 10/2016 | Liu | G06F 1/1656 |

FOREIGN PATENT DOCUMENTS

| | | |
|---|---|---|
| EP | 2879037 A1 | 6/2015 |
| KR | 10-2014-0000932 A | 1/2014 |
| KR | 10-2015-0061336 A | 6/2015 |

* cited by examiner

Primary Examiner — Ricardo L Osorio
(74) Attorney, Agent, or Firm — Dentons US LLP

(57) ABSTRACT

A mobile terminal is disclosed. A mobile terminal according to one embodiment of the present invention includes a sensing unit including at least one of a touch sensor and a pressure sensor, a display unit and a controller, the controller configured to display an execution screen of a first application on the display unit, the controller configured to control a predetermined function of the first application according to a change of a value of a first input signal received via the display unit in a state that the execution screen of the first application is displayed. In this case, the value of the first input signal is based on at least one of the area of a region of the display unit corresponding to the first input signal and pressure putting on the region of the display unit.

15 Claims, 23 Drawing Sheets

FIG. 7
| degree of pressure | Visual feedback | Haptic feedback |
|---|---|---|
| first level | —711 | light, very short |
| second level | —712 | medium, short |
| third level | —713 | strong, long |
| fourth level | —714 | very strong, very long |

(a)           (b)

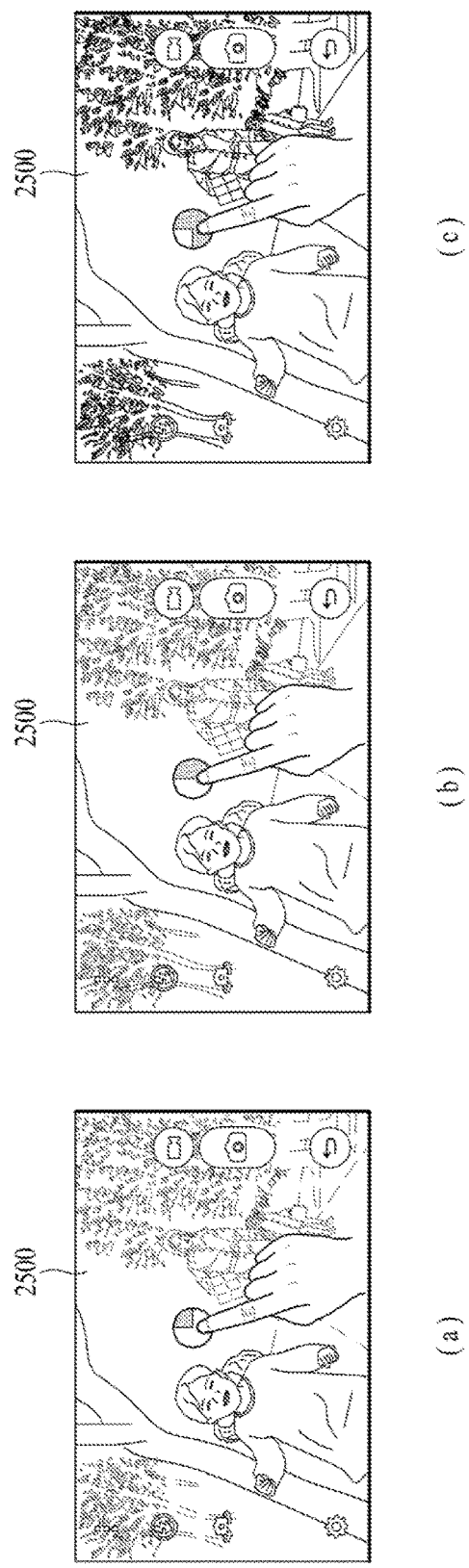

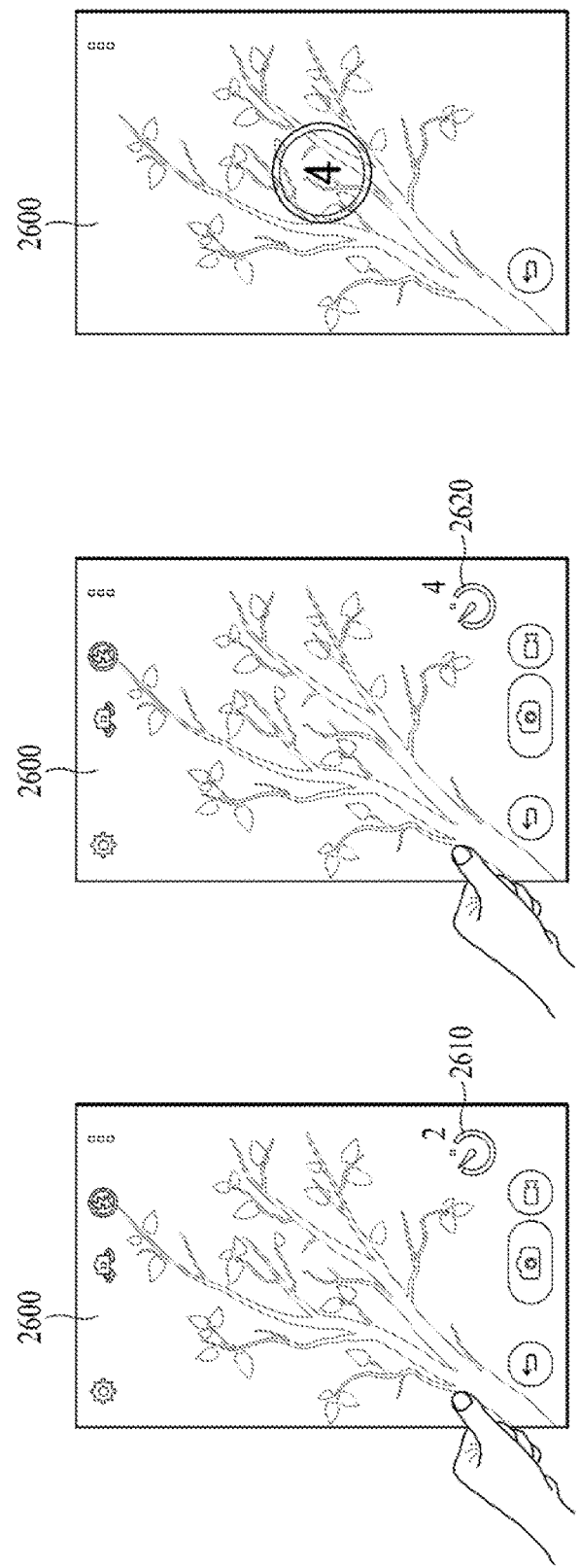

MOBILE TERMINAL

Pursuant to 35 U.S.C. §119(a), this application claims priority to Korean Patent Application No. 10-2015-0098321 filed on Jul. 10, 2015, the entire contents of which is hereby incorporated by reference in its entirety.

BACKGROUND OF THE INVENTION

Field of the Invention

The present invention relates to a mobile terminal enabling a user to more conveniently use the mobile terminal.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, a mobile terminal includes a touch screen in general. And, the mobile terminal can execute functions different from each other depending on a short touch input touching a same area of the touch screen with a degree shorter than a predetermined degree and a long touch input touching the same area of the touch screen with a degree longer than the predetermined degree. Recently, as a function of the mobile terminal is diversified and needs of a customer are diversified, the necessity of controlling the function of the mobile terminal with a simple touch input is gradually increasing.

SUMMARY OF THE INVENTION

Accordingly, an object of the present invention is to address the above-noted and other problems.

An object of the present invention is to provide a mobile terminal capable of controlling a function of a specific application according to pressure corresponding to an input signal of a user.

Another object of the present invention is to provide a mobile terminal capable of providing feedback to enable a user to know a degree of pressure corresponding to an input signal of the user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal includes a sensing unit including at least one of a touch sensor and a pressure sensor, a display unit and a controller, the controller configured to display an execution screen of a first application on the display unit, the controller configured to control a predetermined function of the first application according to a change of a value of a first input signal received via the display unit in a state that the execution screen of the first application is displayed. In this case, the value of the first input signal is based on at least one of the area of a region of the display unit corresponding to the first input signal and pressure putting on the region of the display unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 7 is a diagram for explaining an example of a method of providing feedback according to a value of a first input signal in a mobile terminal according to one embodiment of the present invention;

FIG. 25 is a diagram for explaining a further different example of a method of controlling a predetermined function of a specific application according to a first input signal in a mobile terminal according to one embodiment of the present invention;

FIG. 26 is a diagram for explaining a further different example of a method of controlling a predetermined function of a specific application according to a first input signal in a mobile terminal according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
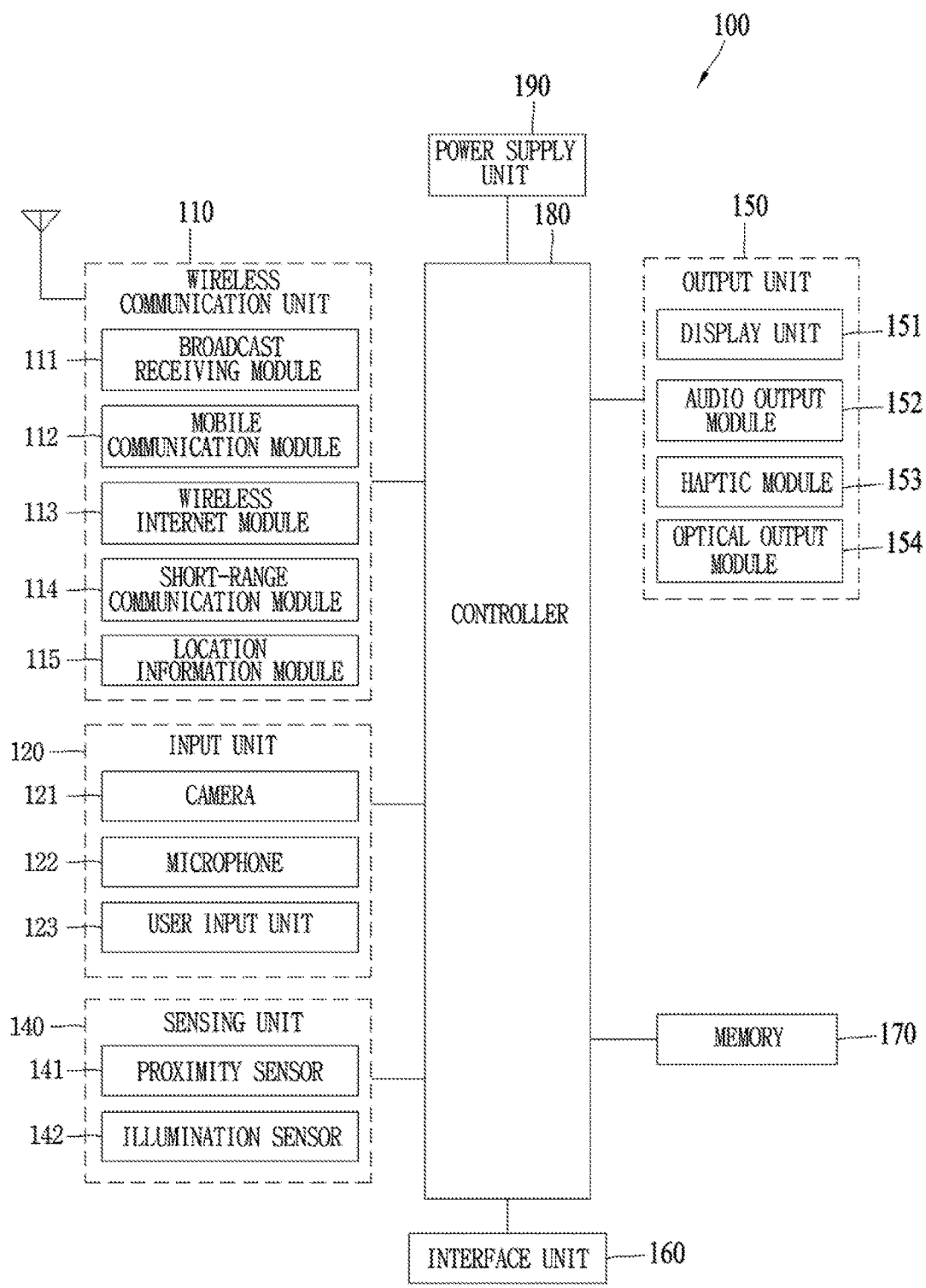
FIG. 1A is a block diagram of a mobile terminal in accordance with the present disclosure.
Figure 1B:
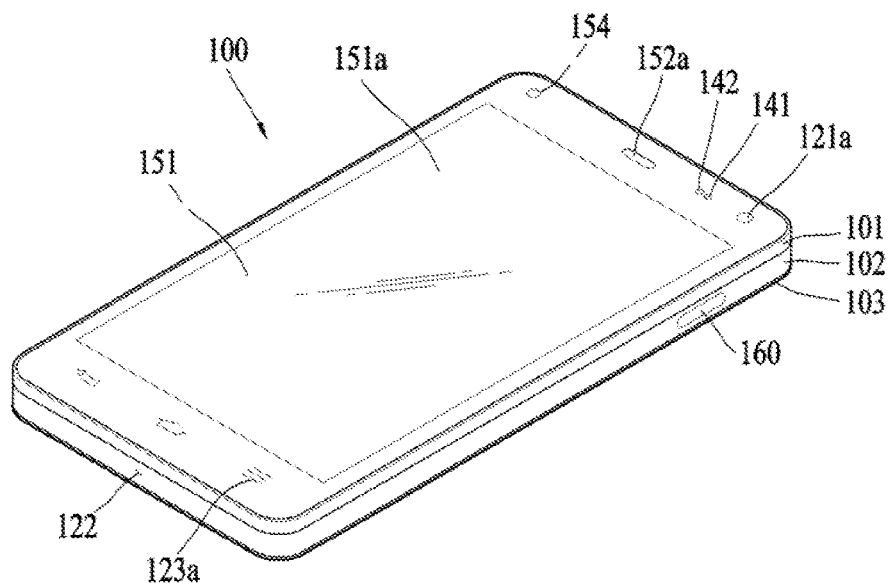
FIGS. 1B and 1C are conceptual views of one example of the mobile terminal, viewed from different directions.
Figure 1C:
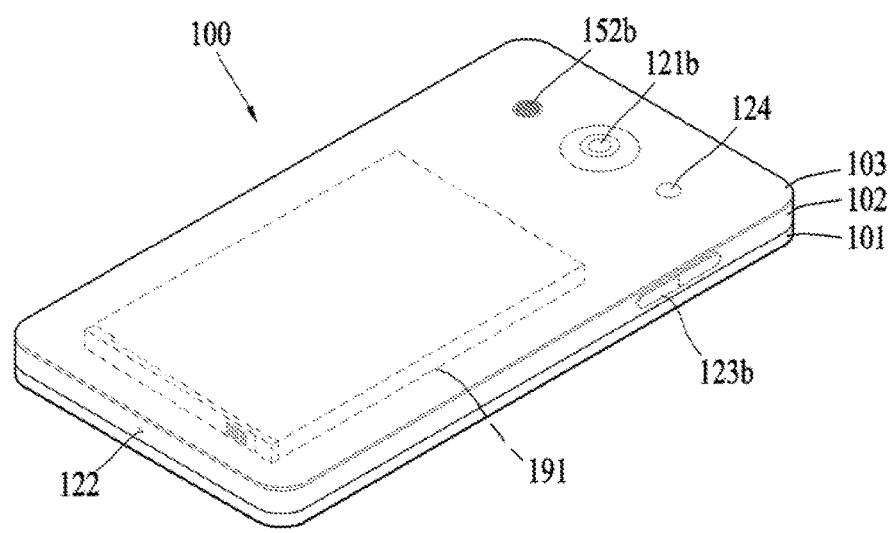

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideB and (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
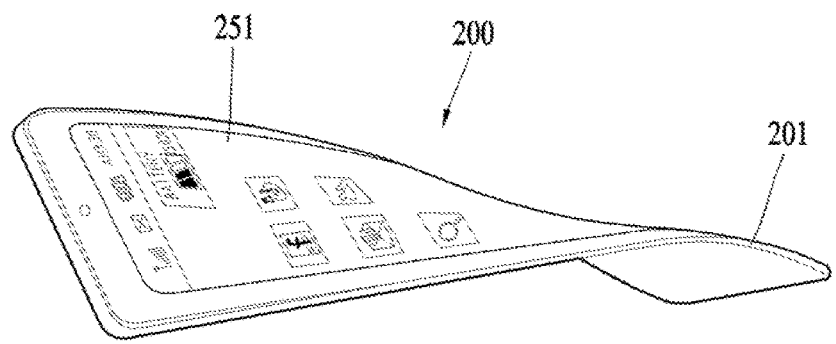
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
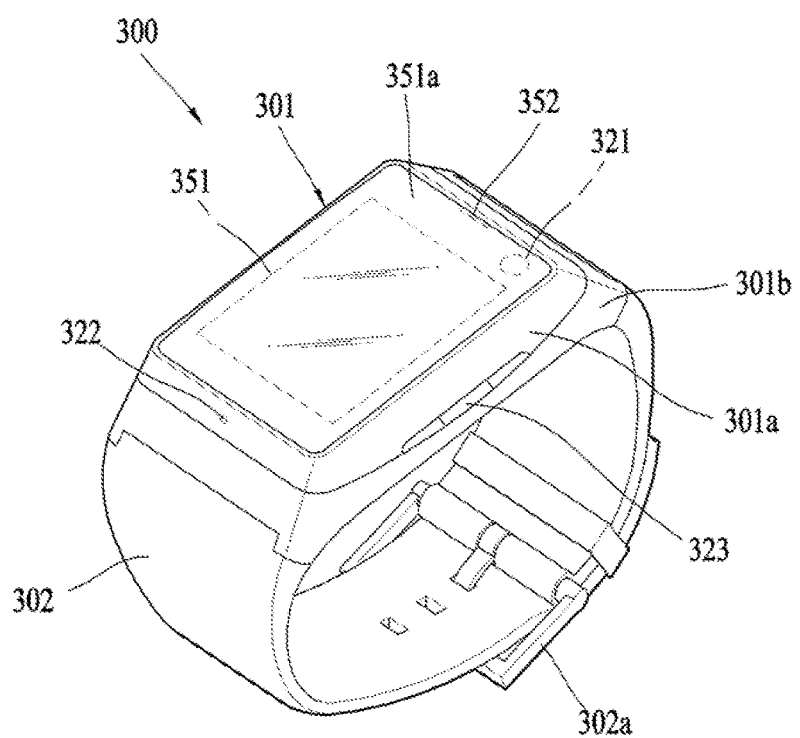
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
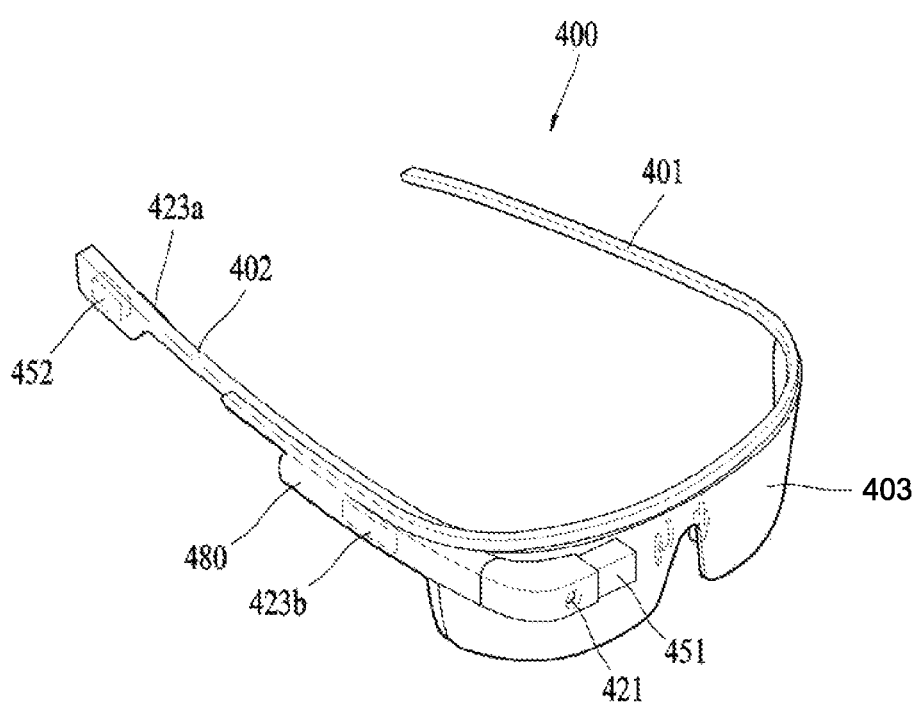
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

In the following, examples of a method of controlling a function of a specific application according to a value of a signal inputted by a user in a mobile terminal 100 are explained in detail with reference to FIG. 5 to FIG. 26. In the present specification, although a mobile terminal 100 shown in FIG. 1a is explained as an example, it is apparent that embodiments of the present invention are applicable to a mobile terminal 200/300/400 mentioned earlier in FIG. 2 to FIG. 4.

Figure 5:
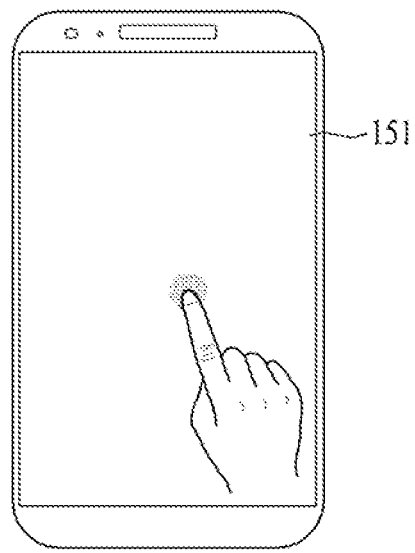
FIG. 5 is a diagram for explaining an input signal received (detected) in a mobile terminal according to one embodiment of the present invention.

FIG. 5 is a diagram for explaining an input signal received (detected) in a mobile terminal according to one embodiment of the present invention.

The controller 180 of the mobile terminal 100 can detect a first input signal received via the display unit 151. The display unit 151 can be implemented by a touch screen including a touch sensor. The sensing unit 140 can include at least one of a touch sensor and a pressure sensor. And, the controller 180 can detect the first input signal based on data sensed by the sensing unit 140.

The first input signal corresponds to a touch input touching a region of the display unit 151 and a value of the first input signal may be equal to or greater than a predetermined degree. In this case, the value of the first input signal can be determined based on at least one of the area of a region of the display unit 151 corresponding to the first input signal and pressure putting on the region of the display unit 151 corresponding to the first input signal. As an example, if the area of the region of the display unit 151 corresponding to the first input signal is equal to or greater than the predetermined degree, the value of the first input signal may be equal to or greater than the predetermined degree. As a different example, if physical pressure putting on the region of the display unit 151 corresponding to the first input signal is equal to or greater than the predetermined degree, the value of the first input signal may be equal to or greater than the predetermined degree. In particular, in terms of a user, it may be able to touch a region of the display unit 151 longer or stronger to generate the first input signal rather than a normal touch input lightly tapping the region of the display unit.

The controller 180 of the mobile terminal 100 can control a predetermined function of a specific application according to a change of a value of the first input signal. For instance, if the first input signal is received in a state that an execution screen of a specific application is displayed on the display unit 151, the controller 180 can control a predetermined function of the specific application according to a value of the first input signal. The controller 180 controls a value corresponding to the predetermined function to increase according to the increase of the value of the first input signal and can control the value corresponding to the predetermined function to decrease according to the decrease of the value of the first input signal.

A user can control a predetermined function of a specific application in a manner of controlling a value of a first input signal. In particular, a user can control the predetermined function of the specific application based on what the user wants in a manner of controlling at least one of the area of a region of the display unit 151 corresponding to the first input signal and pressure putting on the region of the display unit corresponding to the first input signal.

Figure 6:
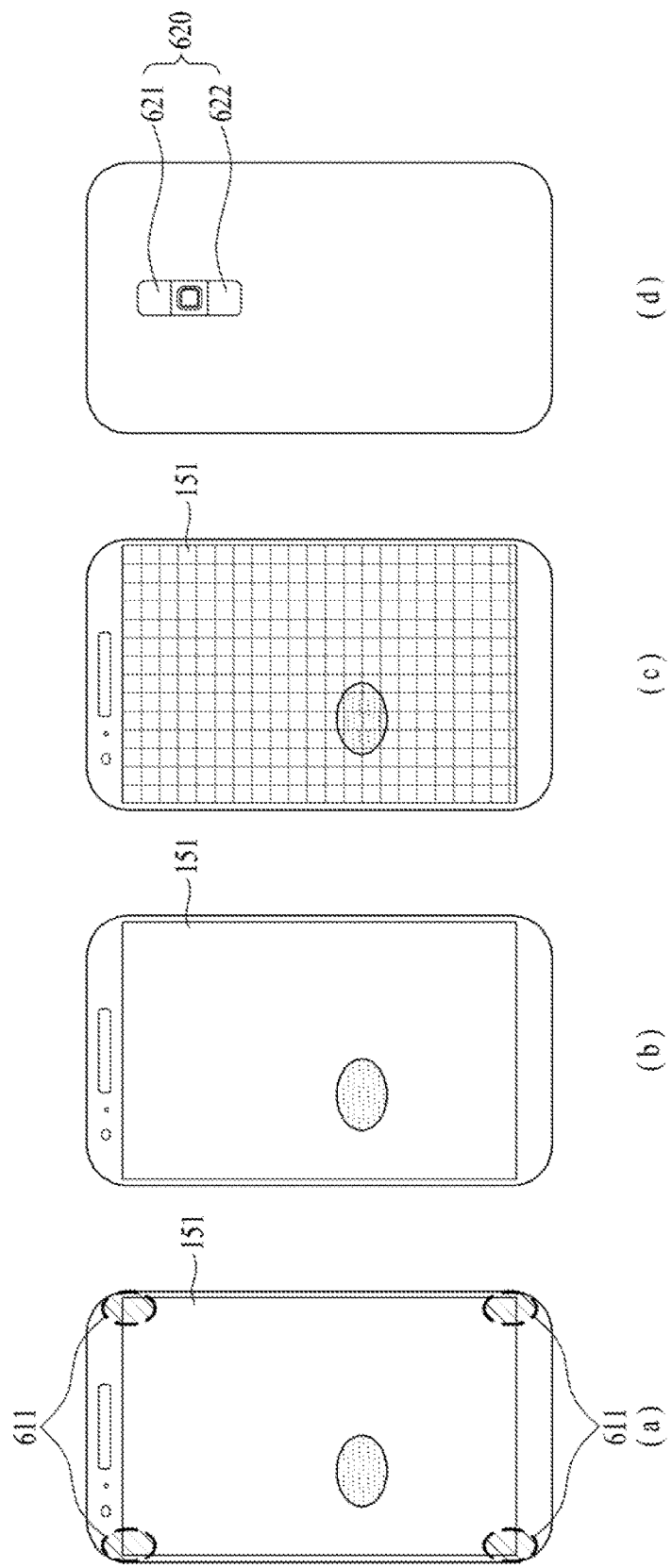
FIG. 6 is a diagram for explaining an example of a method of sensing a first input signal in a mobile terminal according to one embodiment of the present invention.

FIG. 6 is a diagram for explaining an example of a method of sensing a first input signal in a mobile terminal according to one embodiment of the present invention.

The controller 180 of the mobile terminal 100 can detect a first input signal based on data sensed by the sensing unit 140. For instance, if the first input signal is received via the display unit 151, the controller 180 can detect the first input signal that a value of area, a value of pressure and/or a value with which the area and the pressure are combined is equal to or greater than a predetermined degree based on at least one of the area of a region of the display unit 151 corresponding to the first input signal and the pressure putting on the region of the display unit 151 corresponding to the first input signal.

As an example, referring to FIG. 6 (a), the sensing unit 140 can include a pressure sensor 611. The pressure sensor 611 can obtain strength (value) of pressure putting on the pressure sensor 611. For instance, the pressure sensor 611 can be located at near an edge or a corner of the display unit 151. And, if a region of the display unit 151 is touched, pressure putting on the region of the display unit 151 can be deducted based on a value of the pressure sensed by each pressure sensor 611, a distance between adjacent pressure sensors 611, a distance between each pressure sensor 611 and the region of the display unit 151 and the like. And, if a value of the deducted pressure is equal to or greater than a predetermined degree, the controller 180 can detect that a first input signal is received via the region of the display unit 151.

As a different example, referring to FIG. 6 (*b*), the sensing unit 140 includes a pressure sensor and the pressure sensor can form a layered structure with the display unit 151. For example, the pressure sensor can include a piezo element. If a region of the display unit 151 is touched, the pressure sensor can obtain a value of pressure putting on the region. And, the if the obtained value of the pressure is equal to or greater than a predetermined degree, the controller 180 can detect that a first input signal is received via the region of the display unit 151.

As a further different example, referring to FIG. 6 (*c*), if a region of the display unit 151 is touched, the controller 180 detects the area of the touched region. If a value of the detected area is equal to or greater than a predetermined degree, the controller 180 can detect that a first input signal is received via the region of the display unit 151.

Depending on an embodiment, the controller 180 can determine whether to receive a first input signal and a value of the first input signal in a manner of combining the methods mentioned earlier in FIG. 6 (*a*) to (*c*) with each other.

Meanwhile, the controller 180 of the mobile terminal 100 can detect the first input signal via a user input unit 620 instead of the display unit 151. The user input unit 620 can be mounted on the exterior of the mobile terminal 100. For instance, referring to FIG. 6 (*d*), the user input unit 620 can include a pressure sensor including a first key 621 and a second key 622. The controller 180 can control a value corresponding to a predetermined function of a specific application to increase according to a value (i.e., a value of pressure sensed by the first key 621) of a first input signal received via the first key 621 and can control a value corresponding to a predetermined function of a specific application to decrease according to a value (i.e., a value of pressure sensed by the second key 622) of a first input signal received via the second key 622.

FIG. 7 is a diagram for explaining an example of a method of providing feedback according to a value of a first input signal in a mobile terminal according to one embodiment of the present invention.

As mentioned earlier with reference to FIG. 5, the controller 180 of the mobile terminal 100 can control a predetermined function of a specific application according to a value of a first input signal. In particular, if the value of the first input signal changes, a value corresponding to the predetermined function may change as well. A user can control the predetermined function based on what the user wants in a manner of touching a wider/narrower region of the display unit 151 or touching a region of the display unit 151 with bigger/smaller pressure.

Yet, the user may not precisely recognize a change of the area of a region of the display unit 151 touched by the user or a change of pressure putting on the region. Hence, the controller 180 can provide feedback corresponding to the value of the first input signal via an output unit 150. For instance, the controller 180 can output a graphic data corresponding to the value of the first input signal on the display unit 151 as visual feedback or output vibration data corresponding to the value of the first input signal on the haptic module 153 as vibration feedback.

In the present embodiment, a case of changing the value of the first input signal according to a degree of pressure putting on a region of the display unit 151 is explained as an example.

Referring to a Table of FIG. 7, the controller 180 can display indicators 711 to 714 corresponding to the value (a degree of pressure corresponding to the first input signal) of the detected first input signal on the display unit 151. A user can intuitively identify the degree of pressure putting on a region of the display unit 151 touched by the user and may be able to guess at a direction in which a predetermined function of a specific application is controlled. For instance, as the value of the first input signal is getting bigger, the controller 180 can provide visual feedback in a direction reaching to a graphic data 714 via the display unit 151. As the value of the first input signal is getting smaller, the controller 180 can provide visual feedback in a direction reaching to a graphic data 711 via the display unit 151. As an example, the graphic data 711 to 714 can be displayed on a region of the display unit 151 on which the first input signal is received or a different random region of the display unit 151.

And, referring to the Table of FIG. 7, the controller 180 can output vibration data corresponding to a value of the detected first input signal on the haptic module 153. For instance, the controller 180 can control strength of the vibration data and/or output time of the vibration data according to the value of the first input signal.

In the present embodiment, the memory 170 can store the Table shown in FIG. 7 in advance. The value of the first input signal corresponding to each step can be determined as default or can be configured or changed by a user.

Depending on an embodiment, the controller 180 can provide at least one of the visual feedback and the vibration feedback. Besides, the controller can provide audio/optical feedback in addition to the visual feedback and the vibration feedback.

Meanwhile, according to one embodiment of the present invention, the value of the first input signal corresponding to each step can be configured by a user. Regarding this, it is explained with reference to FIG. 8 in the following.

Figure 8:
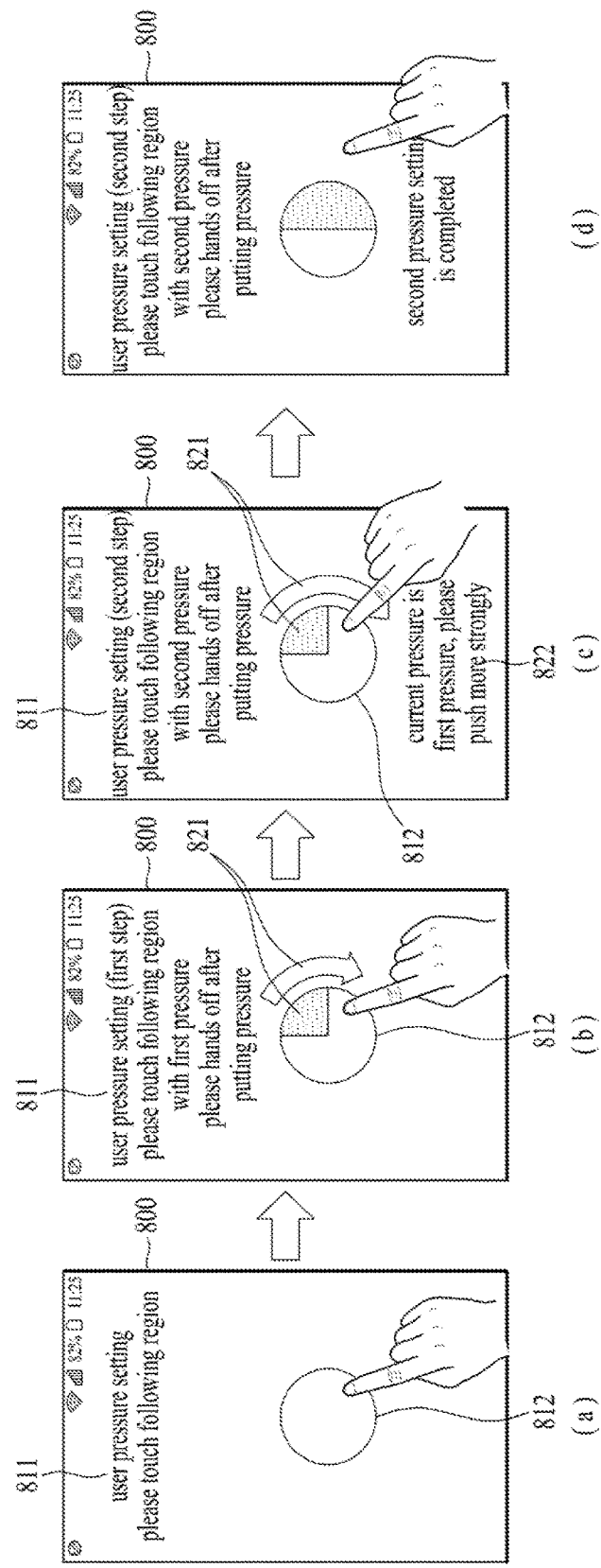
FIG. 8 is a diagram for explaining an example of a method for a user to configure a degree of pressure corresponding to a first input signal in a mobile terminal according to one embodiment of the present invention.

FIG. 8 is a diagram for explaining an example of a method for a user to configure a degree of pressure corresponding to a first input signal in a mobile terminal according to one embodiment of the present invention.

Although the present embodiment explains a case of changing a value of a first input signal according to a degree of pressure putting on a region of the display unit 151 for example, it is apparent that the present embodiment can also be applied to a case that the value of the first input signal is changed according to a change of the area of the region of the display unit 151.

The controller 180 of the mobile terminal 100 can display a screen 800 for configuring pressure of a user on the display unit 151 according to a command for selecting a menu configured to set a degree of pressure corresponding to the first input signal.

Referring to FIGS. 8 (*a*) and (*b*), the screen 800 can include a message for indicating a designated region to be touched with pressure of a first level and an indicator 812 corresponding to the designated region. A user can touch the indicator 812 with first pressure. The controller 180 can display graphic data 821 on the display unit 151 in response to the pressure of touching the indicator 812. The user can intuitively recognize a degree of the pressure putting on the indicator 812 via the graphic data 821. And, the controller 180 can store the first pressure as a value of a first input signal of a first level.

Referring to FIG. 8 (c), the controller 180 can display a message for indicating the designated region to be touched with pressure of a second level and a screen 800 including the indicator 812 corresponding to the designated region of the display unit 151 after the value of the first input signal of the first level is stored. A user can touch the indicator 812 with second pressure greater than the first pressure. The controller 180 can display graphic data 821 on the display unit 151 in response to the pressure touching the indicator 812. The user can intuitively recognize a degree of the pressure putting on the indicator 812 via the graphic data 821. If the pressure putting on the indicator 812 corresponds to the pressure of the first level or is less than the pressure of the second level, the controller 180 can display a message for inducing the user to put stronger pressure on the indicator on the display unit 151.

Referring to FIG. 8 (d), the controller 180 can store the second pressure putting on the indicator 812 as a value of a first input signal of a second level.

According to the present embodiment, since a degree of putting pressure on the display unit 151 varies according to a user, it may be able to configure an input mode appropriate for a user via a pressure configuration mode.

Meanwhile, as mentioned earlier with reference to FIG. 5, if a predetermined function of a specific application is controlled according to a value of a first input signal, a user should continuously put pressure necessary for controlling the predetermined function on the display unit 151. This may be inconvenient for the user. In the following, a method of solving a problem of inconvenience of the user is explained with reference to FIG. 9 to FIG. 14.

Figure 9:
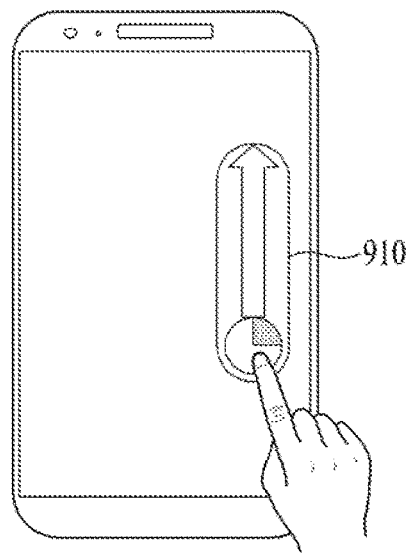
FIG. 9 is a diagram for explaining an example of a method of solving a problem of inconvenience that a user continuously puts pressure necessary for controlling a predetermined function of a specific application according to a first input signal in a mobile terminal according to one embodiment of the present invention.

FIG. 9 is a diagram for explaining an example of a method of solving a problem of inconvenience that a user continuously puts pressure necessary for controlling a predetermined function of a specific application according to a first input signal in a mobile terminal according to one embodiment of the present invention.

When a value of at least one of the area of a region of the display unit 151 corresponding to a first input signal (on which the first input signal is received) and pressure putting on the region corresponds to a value of a first degree, if a predetermined second input signal is received via the display unit 151, the controller 180 of the mobile terminal 100 stores the value of the first degree in the memory 170 and may be able to continuously control a predetermined function of a specific application according to the value of the first degree. In this case, although a first input signal is not received from a user, the controller 180 can generate a first input signal corresponding to the value of the first degree and continuously control the predetermined function of the specific application according to the generated first input signal.

For instance, the second input signal may correspond to a touch input dragged in predetermined direction in a state that the value of at least one of the area of the region of the display unit 151 corresponding to the first input signal and the pressure putting on the region is equal to or greater than a first degree.

Depending on an embodiment, if a first input signal is detected, the controller 180 may display an indicator 910 inducing a touch in the predetermined direction corresponding to the second input signal on the display unit 151. The controller 180 can receive the second input signal via the indicator 910.

According to the present embodiment, when a user intends to maintain a predetermined function of a specific application in a constant state, the user can generate the second input signal in a state that a value of at least one of the area of a region of the display unit 151 corresponding to a first input signal and pressure putting on the region is equal to or greater than a first degree to solve inconvenience of continuously putting prescribed pressure. In the following embodiments, for clarity, if a first input signal corresponding to the pressure of the first degree is maintained by a second input signal, it may use an expression that a pressure maintenance function is configured.

Figure 10:
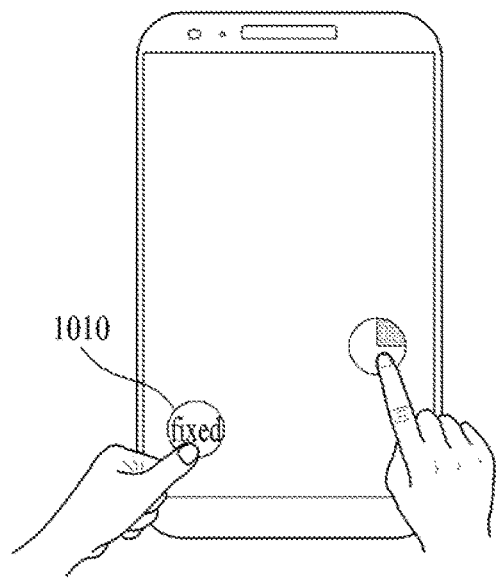
FIG. 10 is a diagram for explaining a different example of a method of solving a problem of inconvenience that a user continuously puts pressure necessary for controlling a predetermined function of a specific application according to a first input signal in a mobile terminal according to one embodiment of the present invention.

FIG. 10 is a diagram for explaining a different example of a method of solving a problem of inconvenience that a user continuously puts pressure necessary for controlling a predetermined function of a specific application according to a first input signal in a mobile terminal according to one embodiment of the present invention.

When a value of at least one of the area of a region of the display unit 151 corresponding to a first input signal (on which the first input signal is received) and pressure putting on the region corresponds to a value of a first degree, if a predetermined second input signal is received via the display unit 151, the controller 180 of the mobile terminal 100 stores the value of the first degree in the memory 170 and may be able to continuously control a predetermined function of a specific application according to the value of the first degree. In this case, although a first input signal is not received from a user, the controller 180 can generate a first input signal corresponding to the value of the first degree and continuously control the predetermined function of the specific application according to the generated first input signal.

If the first input signal is detected, the controller 180 of the mobile terminal 100 can display an icon 1010 corresponding to a function of maintaining a value of the first input signal on the display unit 151.

A user can touch the icon 1010 while maintaining the first input signal in a state that the value of at least one of the area of the region of the display unit 151 corresponding to the first input signal (on which the first input signal is received) and the pressure putting on the region corresponds to the value of the first degree. In the present embodiment, the second input signal may correspond to a command for touching the icon 1010.

Although the first input signal from the user is not detected, the controller 180 can continuously control a predetermined function of a specific application according to a first input signal corresponding to the value of the first degree generated by itself in accordance with the second input signal touching the icon 1010.

Figure 11:
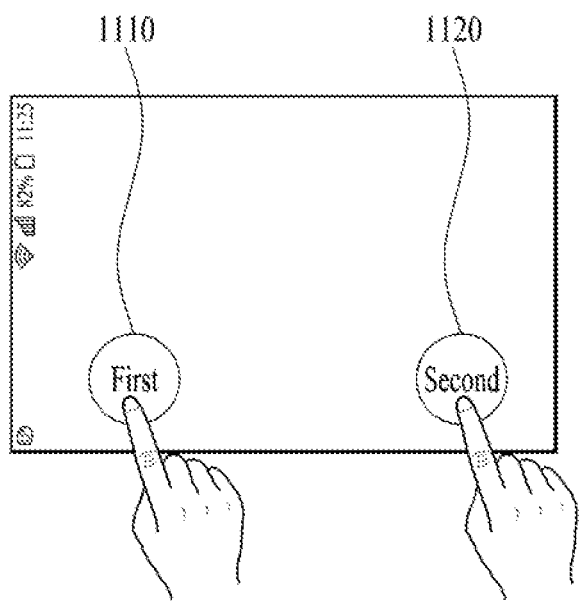
FIG. 11 is a diagram for explaining a further different example of a method of solving a problem of inconvenience that a user continuously puts pressure necessary for controlling a predetermined function of a specific application according to a first input signal in a mobile terminal according to one embodiment of the present invention.

FIG. 11 is a diagram for explaining a further different example of a method of solving a problem of inconvenience that a user continuously puts pressure necessary for controlling a predetermined function of a specific application according to a first input signal in a mobile terminal according to one embodiment of the present invention.

If a predetermined function of a specific application is executed according to a specific command, the controller 180 of the mobile terminal 100 can display a first icon 1110 and a second icon 1120 to control a value corresponding to the predetermined function. The first icon 1110 corresponds to a function of increasing the value corresponding to the predetermined function and the second icon 1120 corresponds to a function of decreasing the value corresponding to the predetermined function.

As an example, the controller 180 can detect a first input signal via the first icon 1110. If a value (a value of at least one of the area of a region of the display unit 151 and pressure putting on the region corresponding to the first input signal) of the first input signal received via the first icon 1110 increases, the controller 180 can increase the value corresponding to the predetermined function. In this case, the value corresponding to the predetermined function may be irrelevant to the release of the first input signal and a decrease of the value of the first input signal received via the first icon 1110. And, the controller 180 can detect a first input signal via the second icon 1120. If a value (a value of at least one of the area of a region of the display unit 151 and pressure putting on the region corresponding to the first input signal) of the first input signal received via the second icon 1120 increases, the controller 180 can decrease the value corresponding to the predetermined function. In this case, the value corresponding to the predetermined function may be irrelevant to the release of the first input signal and a decrease of the value of the first input signal received via the first icon 1110.

As a different example, the controller 180 can increase the value corresponding to the predetermined function according to the count of receiving an input signal tapping the first icon 1110 and decrease the value corresponding to the predetermined function according to the count of receiving an input signal tapping the second icon 1110.

In the following, an example for a case of controlling a predetermined function of a specific application according to the aforementioned first input signal is explained in detail with reference to FIG. 12 to FIG. 26.

Figure 12:
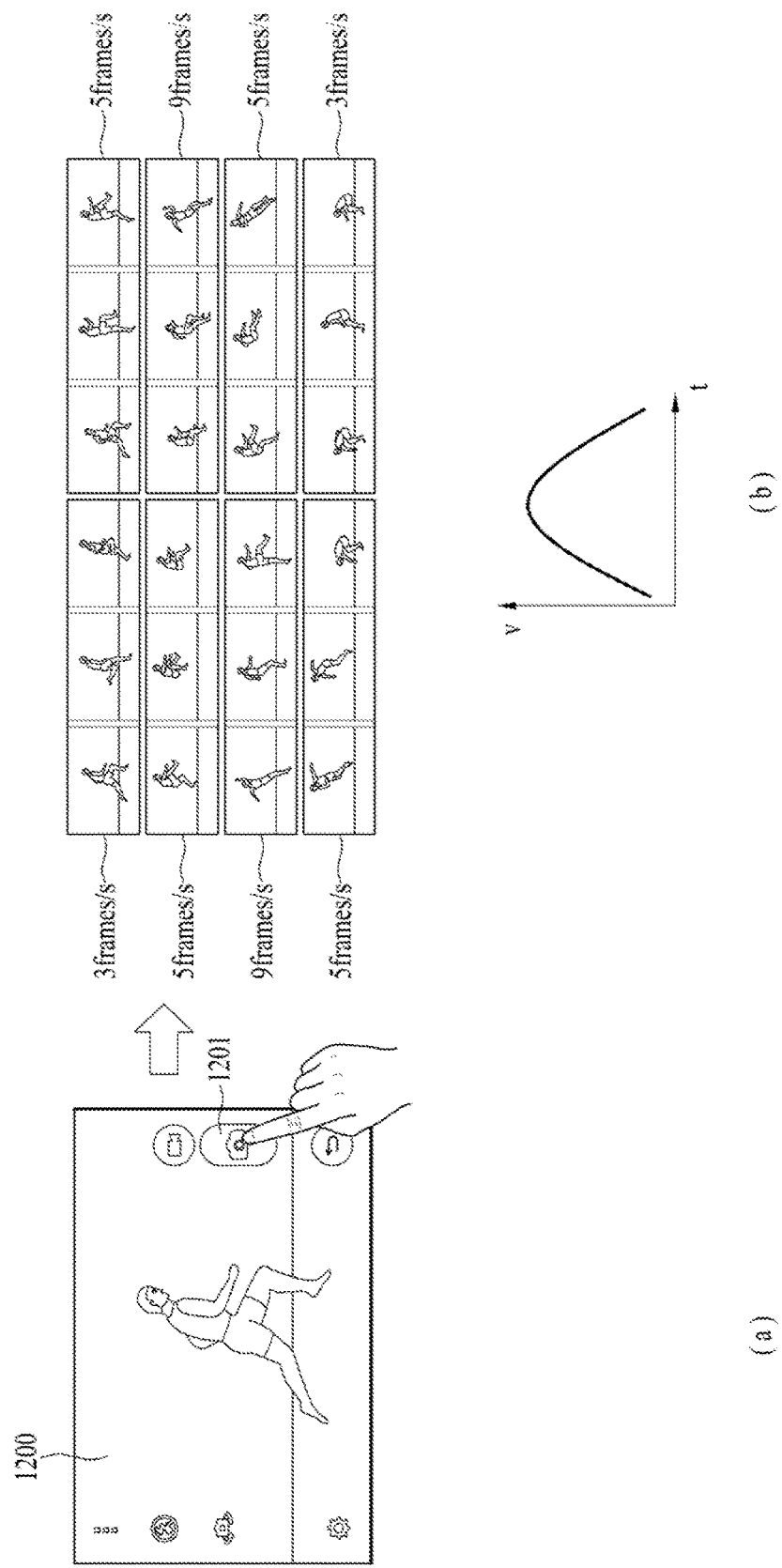
FIG. 12 is a diagram for explaining an example of a method of controlling a predetermined function of a specific application according to a first input signal in a mobile terminal according to one embodiment of the present invention.

FIG. 12 is a diagram for explaining an example of a method of controlling a predetermined function of a specific application according to a first input signal in a mobile terminal according to one embodiment of the present invention. In the present embodiment, assume that the specific application corresponds to a camera application and the predetermined function corresponds to a continuous shooting function. In this case, the continuous shooting function corresponds to a function of obtaining a plurality of still images by a single picture capturing command.

Referring to FIG. 12 (a), the controller 180 of the mobile terminal 100 executes a camera application and can display a preview image 1200 obtained by the camera 121 on the display unit 151. An icon 1201 corresponding to a picture capturing command is displayed on the preview image 1200.

A user can touch the icon 1201 with prescribed pressure. The controller 180 can detect a first input signal touching the icon 1210. In this case, the first input signal may correspond to an input signal that at least one of the area of a region of the display unit 151 corresponding to the first input signal and pressure putting on the region of the display unit 151 corresponding to the first input signal is equal to or greater than a prescribed degree. Depending on an embodiment, the controller 180 can also detect the first input signal by a command of touching a predetermined prescribed region rather than the icon 1201.

And, the controller 180 can control the continuous shooting function of the camera application based on a value of the first input signal, i.e., a value of at least one of the area of the region of the display unit 151 corresponding to the first input signal and the pressure putting on the region of the display unit 151 corresponding to the first input signal.

Specifically, if the value of the first input signal increases, the controller 180 can increase a value (hereinafter, speed of continuous shooting) corresponding to the continuous shooting function. If the value of the first input signal decreases, the controller 180 can decrease the speed of continuous shooting. A value of the speed of continuous shooting corresponding to the value of the first input signal can be stored in the memory 170 in advance. And, if the first input signal is released, the controller 180 can stop capturing (continuous shooting) images captured by the camera 121. The controller 180 can periodically sense the first input signal in every predetermined time interval while the value of the first input signal is changing.

In the present embodiment, assume that a user firstly touches the icon 1201 with gradually increasing pressure, touches the icon with gradually decreasing pressure for predetermined time and removes a finger of the user from the icon 1201 after the predetermined time elapses.

For instance, referring to FIG. 12 (b), the controller 180 can control the camera 121 to capture first three images with first continuous shooting speed (3 frames/s), control the camera 121 to capture next 6 images with second continuous shooting speed (5 frames/s) faster than the first continuous shooting speed, control the camera 121 to capture next 6 images with third continuous shooting speed (9 frames/s) faster than the second continuous shooting speed, control the camera 121 to capture next 6 images with the second continuous shooting speed (5 frames/s) and control the camera 121 to capture last 3 images with the first continuous shooting speed (3 frames/s).

And, the controller 180 can generate one video file in a manner of composing images captured while the first input signal is received. Depending on an embodiment, the controller 180 can display a plurality of captured images on the display unit 151. In this case, the controller can display a single image on a single screen or may be able to provide a function of collecting and watching two or more images.

According to a related art, since it was impossible to control speed of continuous shooting after picture taking in a continuous shooting mode is started, it was difficult to appropriately handle the speed of continuous shooting according to a situation. According to the present embodiment, after picture taking in the continuous shooting mode is started, if a subject statically moves, a user decreases the speed of continuous shooting. If the subject dynamically moves, the user can increase the speed of continuous shooting. By doing so, the user can appropriately handle the speed of continuous shooting in accordance with a situation.

Figure 13:
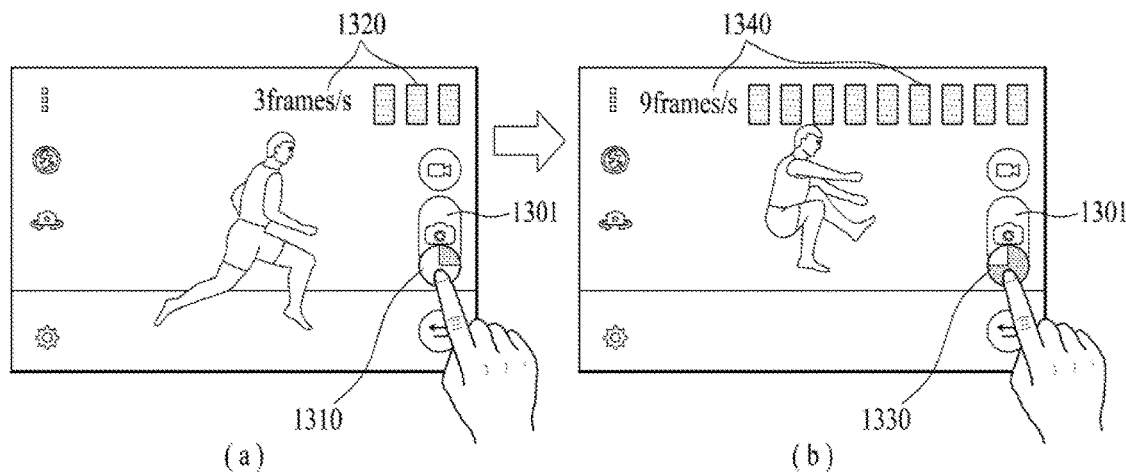
FIG. 13 is a diagram for explaining an example of a method of providing visual feedback via a display unit when a predetermined function of a specific application is controlled according to a first input signal in a mobile terminal according to one embodiment of the present invention.

FIG. 13 is a diagram for explaining an example of a method of providing visual feedback via a display unit when a predetermined function of a specific application is controlled according to a first input signal in a mobile terminal according to one embodiment of the present invention. Detail explanation on contents overlapped with what is mentioned earlier with reference to FIG. 12 is omitted at this time.

Referring to FIG. 13 (a), the controller 180 of the mobile terminal 100 can detect a first input signal touching an icon 1301 corresponding to a picture capturing command. In this case, the first input signal may correspond to an input signal that at least one of the area of a region of the display unit 151 corresponding to the first input signal and pressure putting on the region of the display unit 151 corresponding to the first input signal is equal to or greater than a prescribed degree. And, the controller 180 can display an indicator 1310 indicating a value of the first input signal on the display unit 151. The indicator 1310 can be displayed on a region on which the first input signal is received among the region of the display unit 151. A user can intuitively recognize a current degree of the value of the first input signal via the indicator 1310.

Subsequently, the controller 180 controls a continuous shooting function according to the value of the first input signal and can display a graphic data 1320 indicating a value (i.e., continuous shooting speed (e.g., 3 frames/s)) corresponding to the continuous shooting function on the display unit 151.

Meanwhile, a user can control the continuous shooting speed in the middle of continuously capturing pictures in a manner of controlling pressure touching the icon 1301.

Referring to FIG. 13 (*b*), the controller 180 of the mobile terminal 100 can detect a change of the value of the first input signal touching the icon 1301 in the middle of continuously capturing pictures. And, the controller 180 can display an indicator 1330 indicating the value of the first input signal. The indicator 1310 and the indicator 1330 may vary at least one selected from the group consisting of a size, a shape, color and transparency according to the change of the value of the first input signal. A user can intuitively recognize a current degree of the value of the first input signal via the indicator 1330.

Subsequently, the controller 180 controls a continuous shooting function according to the value of the first input signal and can display a graphic data 1340 indicating a value (i.e., continuous shooting speed (e.g., 9 frames/s)) corresponding to the continuous shooting function on the display unit 151.

According to the present embodiment, a user can easily identify how the continuous shooting speed is controlled according to the first input signal via the change of the graphic data 1320/1340.

Figure 14:
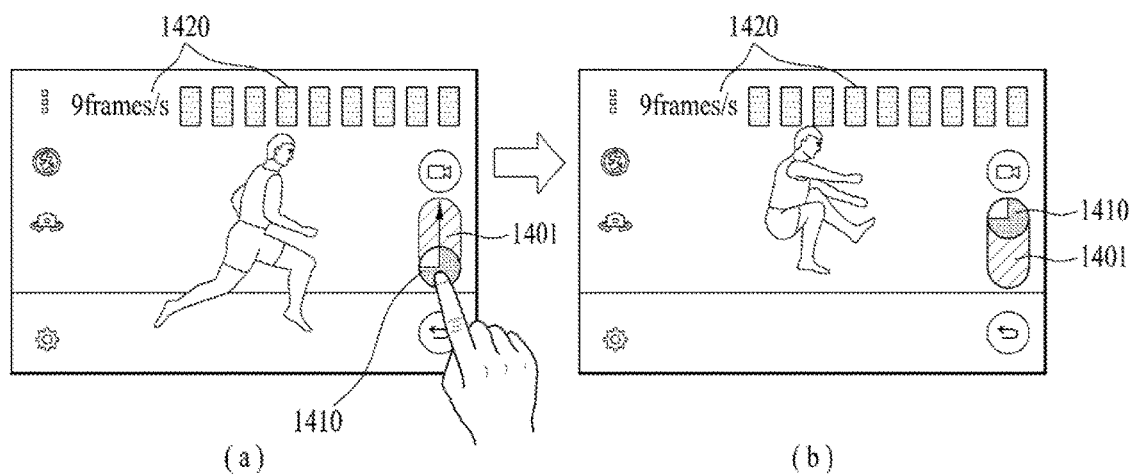
FIG. 14 is a diagram for explaining an example of a method of solving a problem of inconvenience that a user continuously puts pressure necessary for controlling a predetermined function of a specific application according to a first input signal in a mobile terminal according to one embodiment of the present invention.

FIG. 14 is a diagram for explaining an example of a method of solving a problem of inconvenience that a user continuously puts pressure necessary for controlling a predetermined function of a specific application according to a first input signal in a mobile terminal according to one embodiment of the present invention. Detail explanation on contents overlapped with what is mentioned earlier with reference to FIG. 12 and FIG. 13 is omitted at this time.

Referring to FIG. 14 (*a*), the controller 180 of the mobile terminal 100 can detect a first input signal touching an icon 1401 corresponding to a picture capturing command. In this case, the first input signal may correspond to an input signal that at least one of the area of a region of the display unit 151 corresponding to the first input signal and pressure putting on the region of the display unit 151 corresponding to the first input signal is equal to or greater than a prescribed degree. And, the controller 180 can display an indicator 1410 indicating a value of the first input signal on the display unit 151. The indicator 1410 can be displayed on a region on which the first input signal is received among the region of the display unit 151. A user can intuitively recognize a current degree of the value of the first input signal via the indicator 1410.

Subsequently, the controller 180 controls a continuous shooting function according to the value of the first input signal and can display a graphic data 1420 indicating a value (i.e., continuous shooting speed (e.g., 9 frames/s)) corresponding to the continuous shooting function on the display unit 151.

Meanwhile, the controller 180 can receive a predetermined second input signal via the display unit 151 in a state that a value of at least one of the area of the region of the display unit 151 corresponding to the first input signal (on which the first input signal is received) and the pressure putting on the region corresponds to a first degree. In this case, the second input signal may correspond to a touch signal dragged in predetermined direction and released in the state that the value of at least one of the area of the region of the display unit 151 corresponding to the first input signal and the pressure putting on the region corresponds to the first degree.

Referring to FIG. 14 (*b*), the controller 180 stores a value of the first degree (e.g., a value corresponding to continuous shooting speed of 9 frames/s) in the memory 170 according to the second input signal and can continuously control a predetermined function of a specific application according to the value of the first degree. In particular, if the second input signal is detected, the predetermined function of the specific application can be continuously controlled according to the value of the first input signal immediately before the second input signal is detected although a user does not touches the icon 1401 with pressure equal to or greater than a predetermined degree.

Depending on an embodiment, if the second input signal is detected, the controller 180 can move the indicator 1410 to a point on which a touch is released by the second input signal among the region of the display unit 151.

Meanwhile, according to one embodiment of the present invention, a value of the first input signal may change in a state that a pressure maintenance function is configured by the second input signal. Regarding this, it is explained with reference to FIG. 15 in the following.

Figure 15:
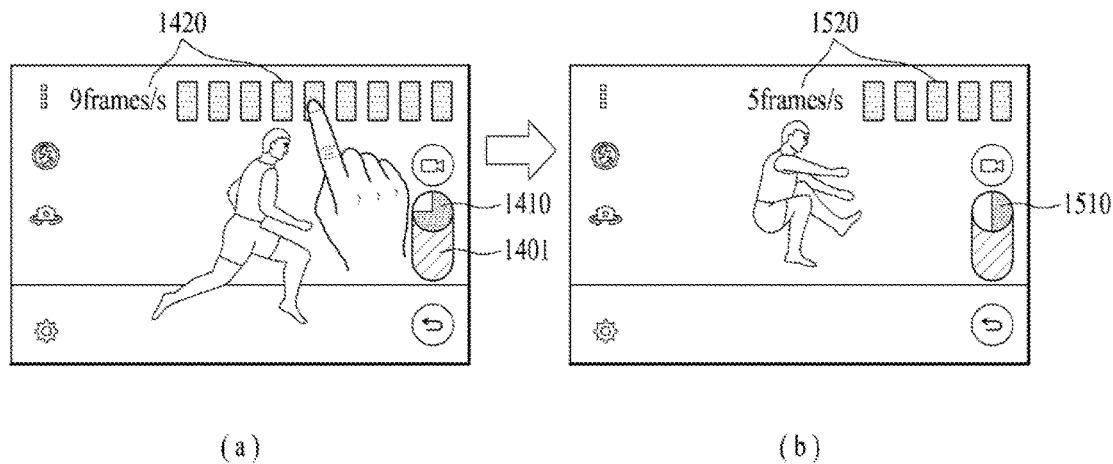
FIG. 15 is a diagram for explaining an example of a method of changing a value of a first input signal in a state that a pressure maintenance function is configured according to a second input signal in a mobile terminal according to one embodiment of the present invention.

FIG. 15 is a diagram for explaining an example of a method of changing a value of a first input signal in a state that a pressure maintenance function is configured according to a second input signal in a mobile terminal according to one embodiment of the present invention. Detail explanation on contents overlapped with what is mentioned earlier with reference to FIG. 14 is omitted at this time.

Referring to FIG. 15 (*a*), if a pressure maintenance function is configured according to the second input signal, the controller 180 can detect a third input signal for controlling a value of a first input signal. For instance, the third input signal can be received via a graphic data 1420 indicating a continuous shooting speed which is controlled according to the first input signal corresponding to a value of the generated first degree. If the pressure maintenance function is configured, the graphic data 1420 may play a role of GUI for controlling the value (i.e., a value corresponding to a predetermined function controlled by the first input signal) of the first input signal generated by the controller 180. For instance, the graphic data 1420 may have a length corresponding to a current value of the first input signal.

The controller 180 can detect a third input signal selecting a value of a second degree via the graphic data 1420.

Referring to FIG. 15 (*b*), the controller 180 regenerates a first input signal corresponding to the value of the second degree and may be able to control continuous shooting speed of a continuous shooting function according to the regenerated first input signal. In particular, when a pressure maintenance function is configured according to the second input signal, if a value of a first input signal changes according to the graphic data 1420, pressure corresponding to the changed value can be maintained. And, the controller 180 displays an indicator 1510 corresponding to the first input signal of the second degree on the display unit 151 and may be able to display a graphic data 1520 indicating continuous shooting speed (e.g., 5 frames/s) controlled by the regenerated first input signal on the display unit 151. If the pressure maintenance function is configured, the graphic data 1520 may play a role of GUI for controlling a value (i.e., a value corresponding to a predetermined function controlled by the first input signal) of the first input signal generated by the controller 180.

Figure 16:
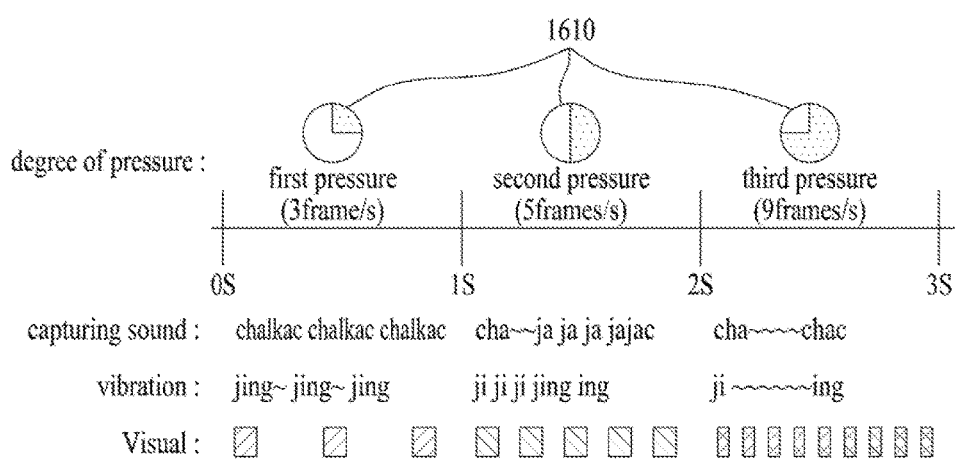
FIG. 16 is a diagram for explaining a type of feedback which is provided when a predetermined function of a specific application is controlled according to a first input signal in a mobile terminal according to one embodiment of the present invention.

FIG. 16 is a diagram for explaining a type of feedback which is provided when a predetermined function of a specific application is controlled according to a first input signal in a mobile terminal according to one embodiment of the present invention.

The controller 180 of the mobile terminal 100 can control a predetermined function of a specific application according to a value of a first input signal. In this case, the controller 180 can provide visual feedback, tactile feedback and/or auditory feedback indicating the value of the first input signal. And, the controller 180 can provide visual feedback, tactile feedback and/or auditory feedback indicating a value (e.g., continuous shooting speed) corresponding to the predetermined function of the specific application controlled according to the first input signal.

For instance, the controller 180 can display an indicator 1610 indicating the value of the first input signal on a region of the display unit 151 on which the first input signal is sensed. The indicator 1610 may vary at least one selected from the group consisting of a size, a shape, color and transparency of the indicator according to a change of the value of the first input signal.

And, the controller 180 provides auditory feedback (capturing sound) via the audio output module 152 according to continuous shooting speed corresponding to a continuous shooting function of a camera application controlled by the value of the first input signal. And, the controller provides tactile feedback (vibration) via the haptic module 153 and may be able to provide visual feedback (graphic data) via the display unit 151. The visual feedback, the tactile feedback and/or the auditory feedback can be appropriately modified according to the continuous shooting speed to enable a user intuitively to recognize the continuous shooting speed.

Meanwhile, according to one embodiment of the present invention, a different function of the specific application can be controlled in a state that the pressure maintenance function is configured by the second input signal.

Figure 17:
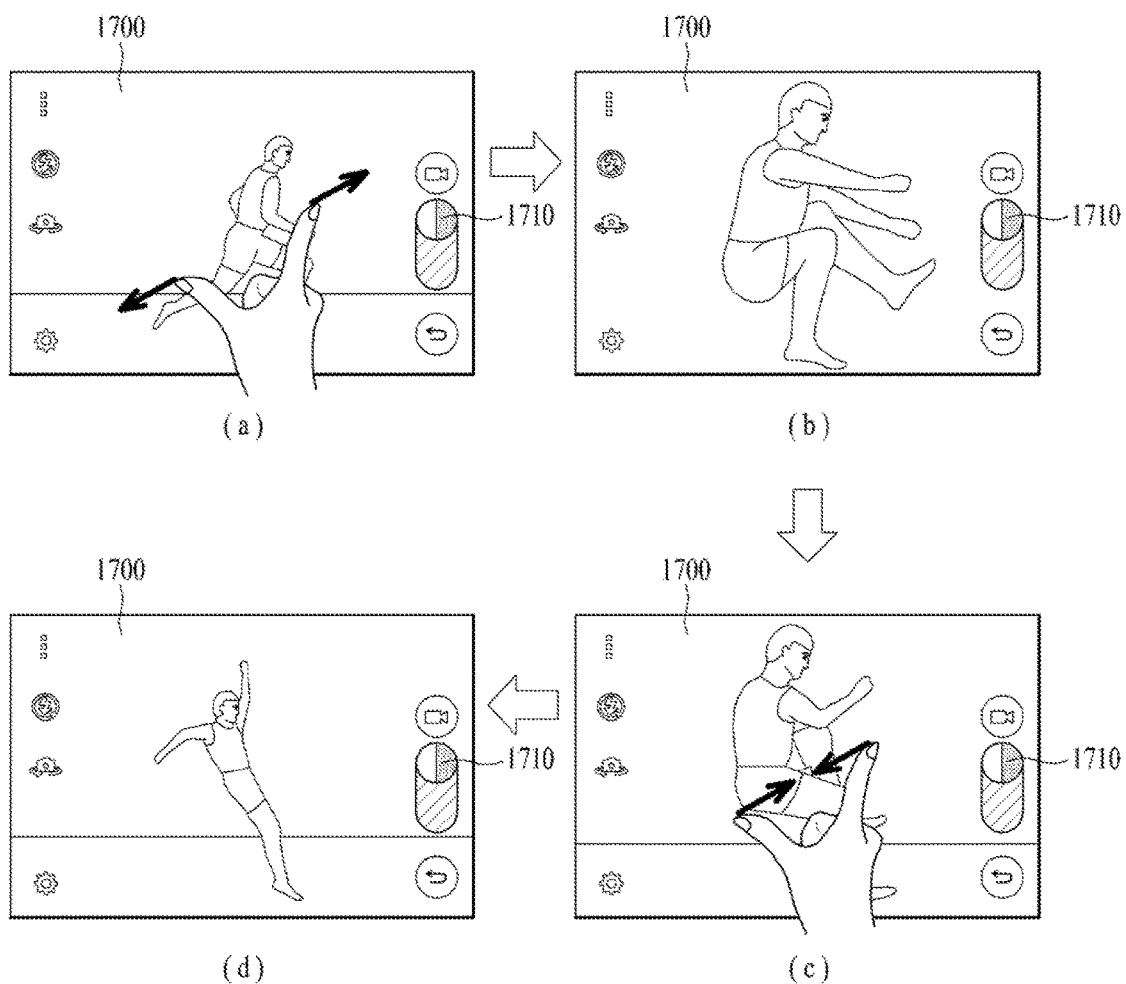
FIG. 17 is a diagram for explaining an example of a method of controlling a different value of a specific application in a state that a pressure maintenance function is configured according to a second input signal in a mobile terminal according to one embodiment of the present invention.

FIG. 17 is a diagram for explaining an example of a method of controlling a different value of a specific application in a state that a pressure maintenance function is configured according to a second input signal in a mobile terminal according to one embodiment of the present invention. Detail explanation on contents overlapped with what is mentioned earlier with reference to FIG. 14 is omitted at this time.

The controller 180 of the mobile terminal 100 generates a first input signal of a first degree according to the second input signal and can control continuous shooting speed corresponding to a continuous shooting function according to the generated first input signal. And, the controller 180 can display an indicator 1710 indicating a value of the first degree on the display unit 151. Although a first input signal is not received from a user, the controller 180 can constantly maintain the continuous shooting speed according to the value of the first degree.

Meanwhile, a user may change a display magnification of a preview image 1700 by controlling a focal length of the camera 121 in a state that the pressure maintenance function is configured according to the second input signal.

Referring to FIGS. 17 (a) and (b), if a zoom-in command is detected via the display unit 151, the controller 180 can enlarge the display magnification of the preview image 1700 in a manner of controlling the focal length of the camera 121 to be long.

Referring to FIGS. 17 (c) and (d), if a zoom-out command is detected via the display unit 151, the controller 180 can reduce the display magnification of the preview image 1700 in a manner of controlling the focal length of the camera 121 to be short.

If a capture stop command is detected or a release of the first input signal is detected, the controller 180 can store a plurality of captured images in the memory 170. In this case, the controller 180 can store an image of which the display magnification is changed by the zoom-in/zoom-out command in the memory 170 or an image of original predetermined display magnification in the memory 170 in a manner of ignoring the change of the display magnification of the preview image 1700 changed by the zoom-in/zoom-out command.

Figure 18:
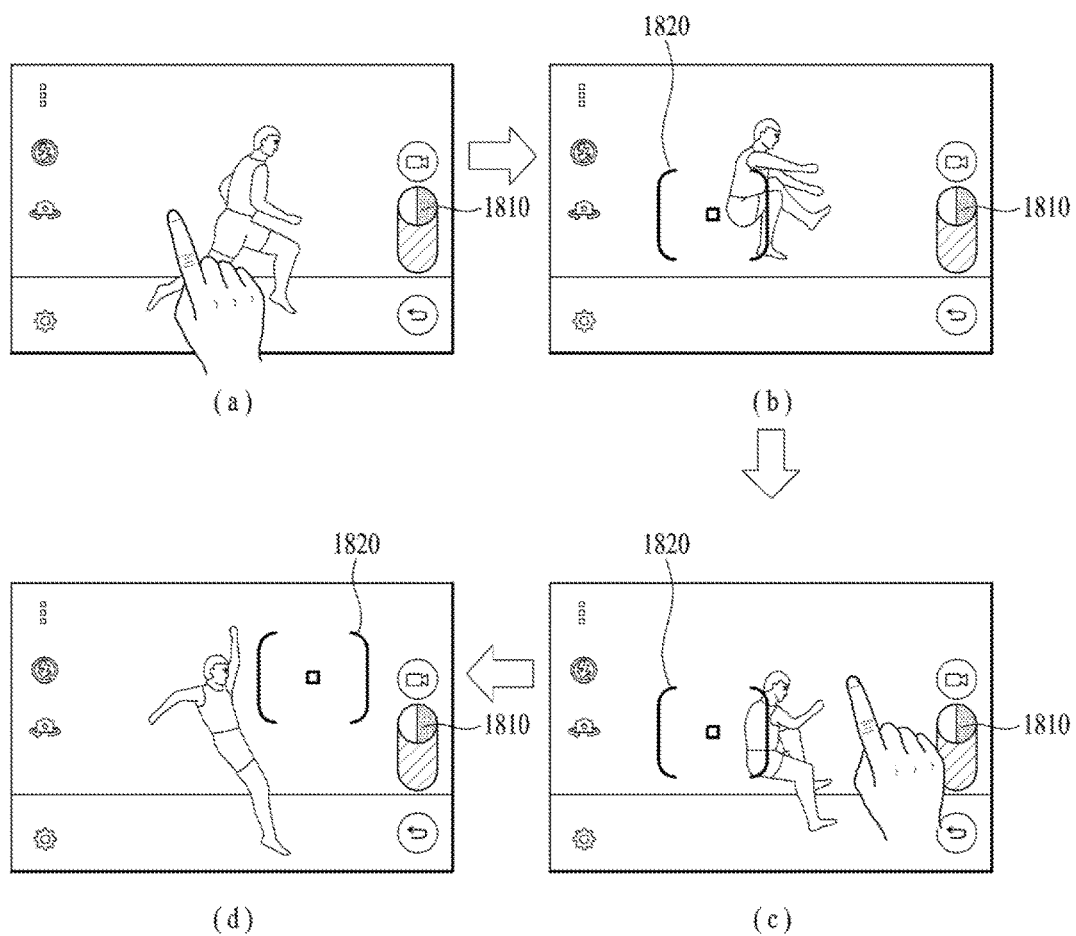
FIG. 18 is a diagram for explaining a different example of a method of controlling a different value of a specific application in a state that a pressure maintenance function is configured according to a second input signal in a mobile terminal according to one embodiment of the present invention.

FIG. 18 is a diagram for explaining a different example of a method of controlling a different value of a specific application in a state that a pressure maintenance function is configured according to a second input signal in a mobile terminal according to one embodiment of the present invention. Detail explanation on contents overlapped with what is mentioned earlier with reference to FIG. 14 is omitted at this time.

The controller 180 of the mobile terminal 100 generates a first input signal of a first degree according to the second input signal and can control continuous shooting speed corresponding to a continuous shooting function according to the generated first input signal. And, the controller 180 can display an indicator 1810 indicating a value of the first degree on the display unit 151. Although a first input signal is not received from a user, the controller 180 can constantly maintain the continuous shooting speed according to the value of the first degree.

Meanwhile, a user can control/change a focused area in a state that a pressure maintenance function is configured according to the second input signal.

Referring to FIGS. 18 (a) and (b), if a command for touching a first area of the display unit 151 is detected, the controller 180 controls the camera 121 to configure the first area as a focused area and can display an indicator 1820 indicating that a focus is on the first area on the first area.

Referring to FIGS. 18 (c) and (d), if a command for touching a second area of the display unit 151 is detected, the controller 180 controls the camera 121 to configure the second area as a focused area and can display the indicator 1820 on the second area by moving the indicator.

Figure 19:
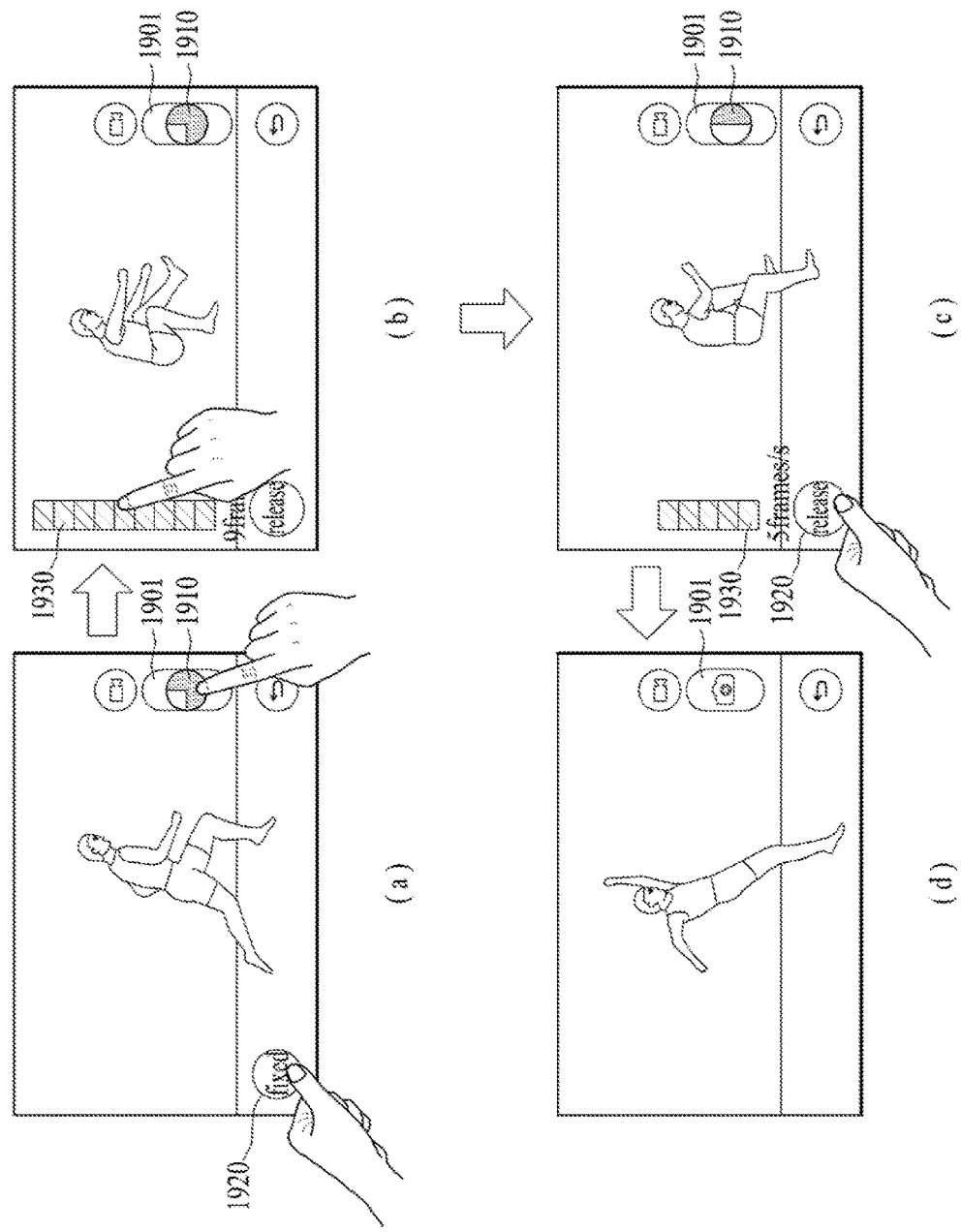
FIG. 19 is a diagram for explaining a different example of a method of solving a problem of inconvenience that a user continuously puts pressure necessary for controlling a predetermined function of a specific application according to a first input signal in a mobile terminal according to one embodiment of the present invention.

FIG. 19 is a diagram for explaining a different example of a method of solving a problem of inconvenience that a user continuously puts pressure necessary for controlling a predetermined function of a specific application according to a first input signal in a mobile terminal according to one embodiment of the present invention.

Referring to FIG. 19 (a), the controller 180 of the mobile terminal 100 can detect a first input signal touching an icon 1901 corresponding to a picture capturing command. In this case, the first input signal may correspond to an input signal that at least one of the area of a region of the display unit 151 corresponding to the first input signal and pressure putting on the region of the display unit 151 is equal to or greater than a predetermined degree. And, the controller 180 can display an indicator 1910 indicating a value of the first input signal on the display unit 151. The indicator 1910 can be displayed on a region on which the first input signal is received among the region of the display unit 151. A user can intuitively recognize a current degree of the first input signal via the indicator 1910.

When a value of at least one of the area of a region of the display unit 151 corresponding to a first input signal (on which the first input signal is received) and pressure putting on the region corresponds to a value of a first degree, if a second input signal touching the icon 1920 is detected, the controller 180 stores a value of the first degree in the memory 170, generates a first input signal corresponding to the value of the first degree and can continuously control a predetermined function of a specific application according to the generated first input signal. In particular, if the second input signal is detected, the controller 180 can continuously control the predetermined function (e.g., a continuous shooting function) of the specific application according to the first input signal generated by itself, although the first input signal is not received from the user.

Referring to FIG. 19 (*b*), the controller 180 controls continuous shooting speed of a continuous shooting function according to the first input signal, which is generated to have the value of the first degree, and can display a graphic data 1930 indicating continuous speed (e.g., 9 frames/s) on the display unit 151.

A user can control/change a value of the first input signal generated by the controller 180 in a state that the pressure maintenance function is configured according to the second input signal.

If the pressure maintenance function is configured according to the second input signal, the controller 180 can detect a third input signal for controlling the value of the first input signal. For instance, the third input signal can be received via a graphic data 1930 indicating continuous speed controlled by the first input signal corresponding to the generated value of the first degree. If the pressure maintenance function is configured, the graphic data 1930 may play a role of GUI for controlling the value (i.e., a value corresponding to a predetermined function controlled by the first input signal) of the first input signal generated by the controller 180.

Referring to FIG. 19 (*c*), if the third input signal for selecting a value of a second degree is detected via the graphic data 1930, the controller 180 regenerates a first input signal corresponding to the value of the second degree and can control continuous shooting speed of a continuous shooting function according to the regenerated first input signal. In particular, when the pressure maintenance function is configured according to the second input signal, if the value of the first input signal is changed via the graphic data 1930, pressure corresponding to the changed value can be maintained. And, the controller 180 displays an indicator 1910 corresponding to the first input signal of the second degree on the display unit 151 and can display the graphic data 1930 indicating continuous shooting speed (e.g., 5 frames/s) controlled by the regenerated by the first input signal on the display unit 151. If the pressure maintenance function is configured, the graphic data 1930 may play a role of GUI for controlling the value (i.e., a value corresponding to a predetermined function controlled by the first input signal) of the first input signal generated by the controller 180.

Meanwhile, if a user intends to release the pressure maintenance function, the user may select the icon 1920 again.

Referring to FIGS. 19 (*c*) and (*d*), if a fourth input signal touching the icon 1920 is detected, the controller 180 can release the pressure maintenance function. As an example, the controller 180 can adjust continuous shooting speed from 5 frames/s to 0 frame/s (i.e., release of continuous shooting function) during predetermined time or immediately release the continuous shooting function in response to the fourth input signal.

Meanwhile, according to one embodiment of the present invention, when a continuous shooting function of a camera application is controlled according to a first input signal, if continuous shooting speed exceeds a predetermined degree according to a value of the first input signal, a capturing mode of the camera 121 can be switched to a video capturing mode from a still image capturing mode. Regarding this, it is explained with reference to FIG. 20 in the following.

Figure 20:
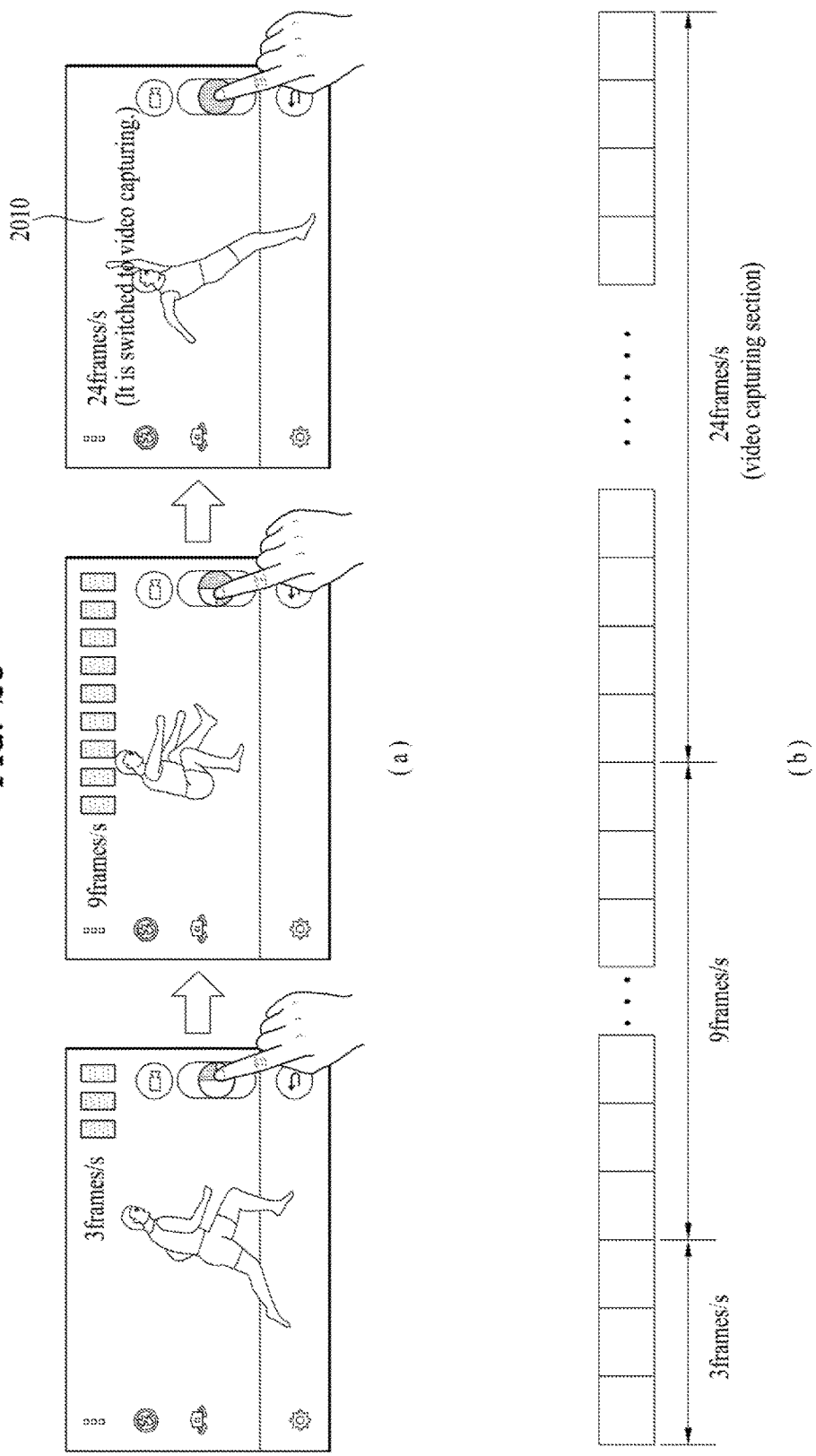
FIG. 20 is a diagram for explaining an example of a method of switching a capturing mode of a camera in a mobile terminal according to one embodiment of the present invention in case that a value of a first input signal exceeds a predetermined degree.

FIG. 20 is a diagram for explaining an example of a method of switching a capturing mode of a camera in a mobile terminal according to one embodiment of the present invention in case that a value of a first input signal exceeds a predetermined degree.

Referring to FIG. 20 (*a*), the controller 180 of the mobile terminal 100 can control continuous shooting speed corresponding to a continuous shooting function of a camera application according to a value of a first input signal. If the value of the first input signal increases, the controller 180 can increase the continuous shooting speed. If the value of the first input signal decreases, the controller 180 can decrease the continuous shooting speed.

If the value of the first input signal exceeds a predetermined degree and continuous shooting speed exceeds a predetermined degree (e.g., 18 frames/s), the controller 180 can switch a capturing mode of the camera to a video capturing mode from a still image capturing mode. If the continuous shooting speed exceeds the predetermined degree, it may be considered it as an intention of a user is to capture a video rather than a still image. Depending on an embodiment, when the value of the first input signal exceeds the predetermined degree, if a predetermined command is separately detected, the controller 180 can switch the capturing mode of the camera to the video capturing mode from the still image capturing mode.

The controller 180 can provide feedback indicating that the capturing mode of the camera is switched into the video capturing mode. As an example, the controller 180 can output a message indicating that the capturing mode is switched into the video capturing mode on the display unit 151. As a different example, if the capturing mode is switched into the video capturing mode, the controller 180 can output predetermined audio data via the audio output module 152 or output predetermined vibration data via the haptic module 153.

Referring to FIG. 20 (*b*), in relation to FIG. 20 (*a*), the controller 180 generates a single video file using a plurality of images (e.g., images captured by continuous shooting speed of 3 frames/s and images captured by continuous shooting speed of 9 frames/s) captured in a still image capturing mode and a plurality of images (e.g., images captured by continuous shooting speed of 24 frames/s) captured in a video capturing mode and can store the generated video file in the memory 170. Depending on an embodiment, the controller 180 can display a single image on a single screen or may be able to provide a function of collecting and watching two or more images while displaying a plurality of the captured images on the display unit 151.

Depending on an embodiment, if the value of the first input signal is reduced to less than a predetermined degree after the capturing mode is switched into the video capturing mode in the middle of capturing a video, the controller 180 can switch the capturing mode into the still image capturing mode (continuous shooting mode) from the video capturing mode.

And, depending on an embodiment, if the capturing mode is switched into the video capturing mode, the controller 180 activates the microphone 122 and can store audio data corresponding to an external audio signal around the mobile terminal 100 in the memory 170. And, if the capturing mode is switched back into the still image mode (continuous shooting mode) from the video capturing mode, the controller 180 can deactivate the microphone 122 or maintain an activated state of the microphone 122.

Meanwhile, according to one embodiment of the present invention, continuous shooting can be performed with predetermined continuous shooting speed irrespective of a value of a first input signal to compensate for the loss of frames lost by a user when the continuous shooting is performed. Regarding this, it is explained with reference to FIG. 21 and FIG. 22 in the following.

Figure 21:
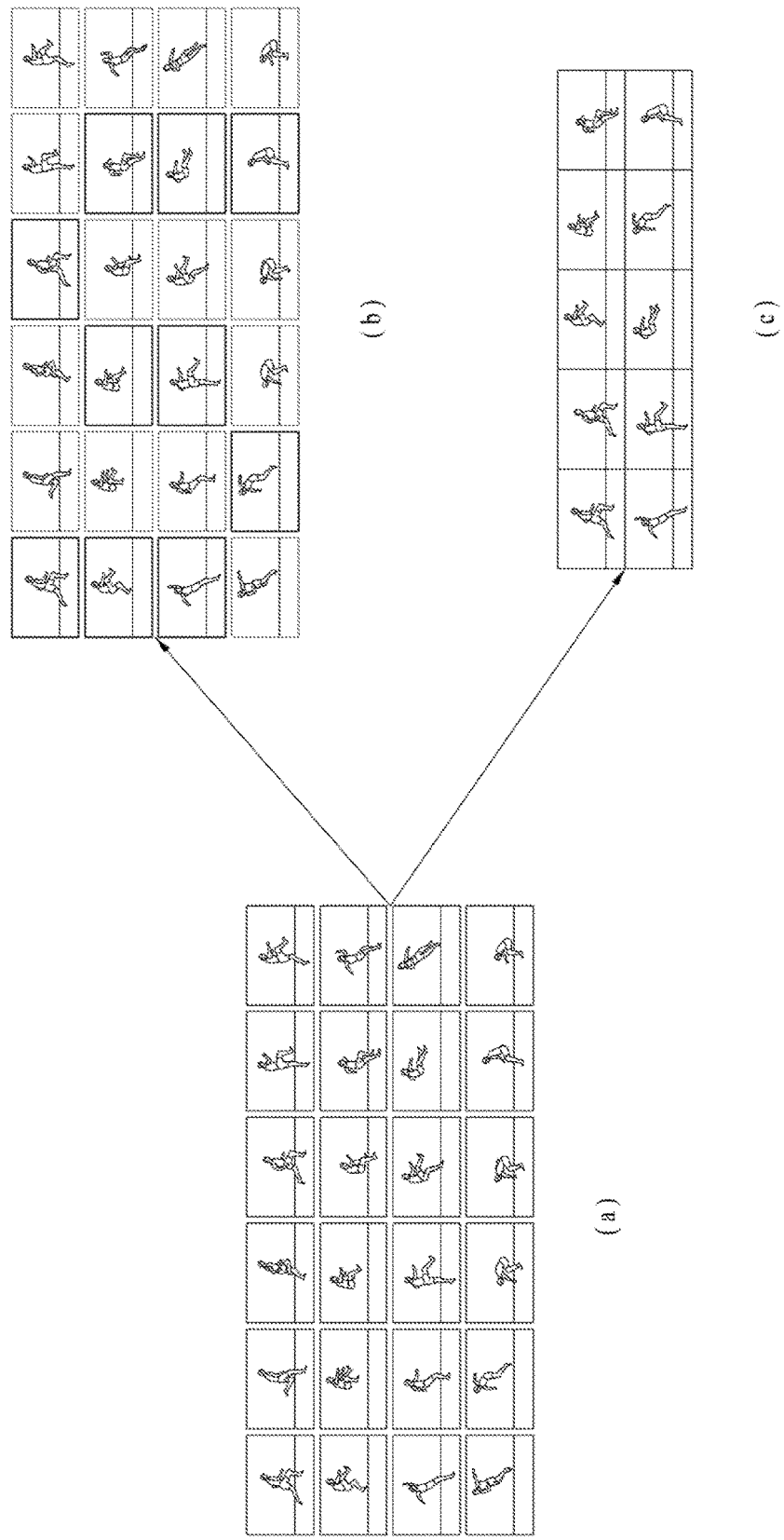
FIG. 21 is a diagram for explaining an example of a method of displaying a plurality of images captured according to a first input signal in a mobile terminal according to one embodiment of the present invention.

FIG. 21 is a diagram for explaining an example of a method of displaying a plurality of images captured according to a first input signal in a mobile terminal according to one embodiment of the present invention.

Referring to FIG. 21 (*a*), the controller 180 can control the camera 121 to continuously shoot with predetermined continuous shooting speed irrespective of a value of a first input signal while controlling a continuous shooting function according to the first input signal. As an example, the predetermined continuous shooting speed may correspond to maximum continuous shooting speed available in a still image capturing mode according to performance of the camera 121.

And, referring to FIG. 21 (*b*), if a predetermined command is detected, the controller 180 can display a plurality of images corresponding to continuous shooting speed according to a value of the first input signal in a manner of distinguishing a plurality of the images from other images among the whole of captured images while displaying the captured images on the display unit 151. In particular, continuous shooting is performed with maximum continuous shooting speed capable of being performed by the camera 121 and an image corresponding to the first input signal inputted by a user can be outputted in a manner of being distinguished from other images when the continuously captured images are outputted on the display unit 151 (e.g., images captured by 3 frames/s corresponding to the first input signal are displayed in a manner of being distinguished from other images among images captured by 12 frames/s). When a user controls the continuous shooting speed according to a movement of a subject, since timing of putting pressure varies, the user may lose a frame of a preferred image. Hence, the continuous shooting can be performed with the predetermined continuous shooting speed irrespective of the value of the first input signal and a frame of an image lost by the user can be compensated in the future.

Meanwhile, referring to FIG. 21 (*c*), the controller 180 can display a plurality of images corresponding to the value of the first input signal only on the display unit 151 among the whole of the captured images. And, if a predetermined command is inputted from a user, the controller 180 can display a screen such as a screen shown in FIG. 21 (*b*) on the display unit 151.

Figure 22:
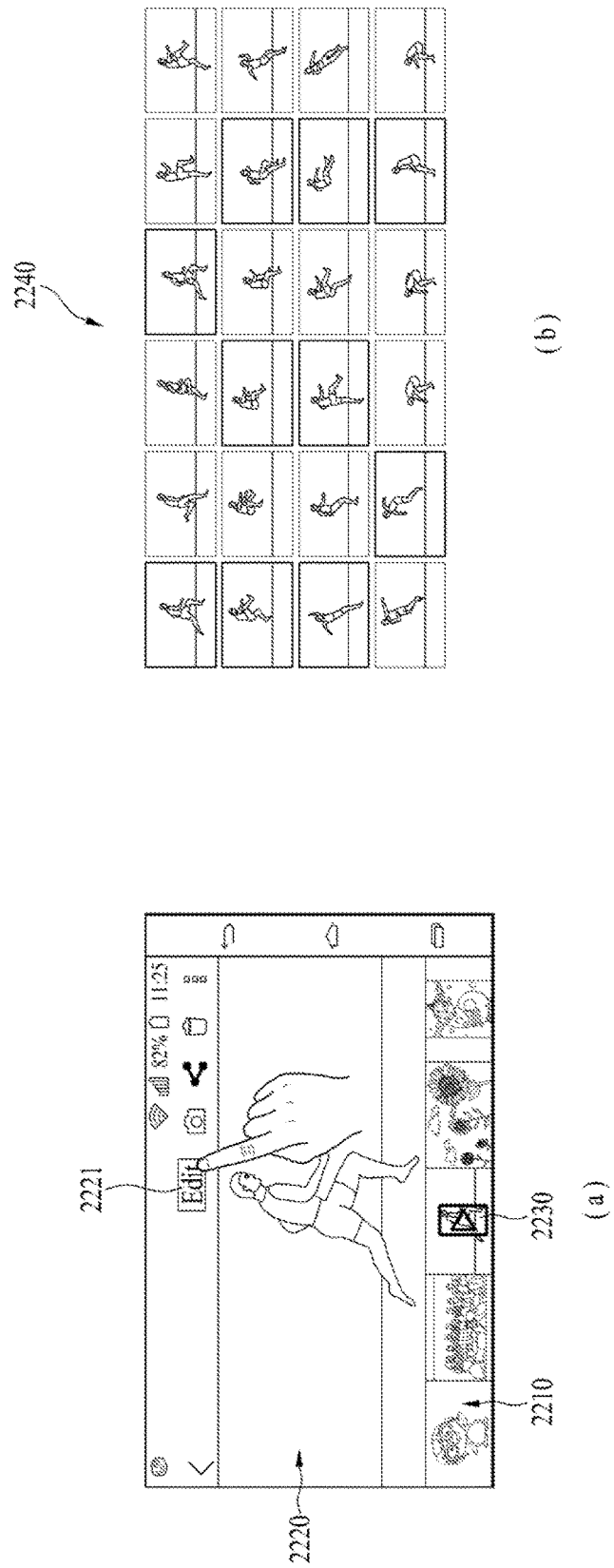
FIG. 22 is a diagram for explaining a different example of a method of displaying a plurality of images captured according to a first input signal in a mobile terminal according to one embodiment of the present invention.

FIG. 22 is a diagram for explaining a different example of a method of displaying a plurality of images captured according to a first input signal in a mobile terminal according to one embodiment of the present invention.

Referring to FIG. 22 (*a*), an execution screen of a gallery application is displayed on the display unit 151. The controller 180 displays a list of images stored in the memory 170 on a first region 2210 and can display an image corresponding to an item selected from the list on a second region 2220. The controller 180 can display an indicator 2230 indicating an image corresponding to a video file generated by using a plurality of continuously captured images on the list of the first region 2210.

If the image corresponding to the video file generated by using a plurality of the continuously captured images on the list of the first region 2210 is selected, the controller 180 can display at least a part of the selected image on the second region 2220. For instance, a playback screen of the video file or a first screen of the video file can be displayed on the second region 2220.

And, the second region 2220 can include an icon 2221 corresponding to an edit function capable of editing a plurality of images included in the video file.

As shown in FIG. 22 (*b*), if a command for selecting the icon 2221 is received, the controller 180 can display a plurality of images 2240 related to the video file on the display unit 151. A plurality of the images 2240 displayed on the display unit 151 can include not only the images included in the video file but also other images captured by the camera 121 when the images included in the video file are captured. In particular, as mentioned earlier with reference to FIG. 21, if a continuous shooting command is detected, the controller 180 controls a continuous shooting function according to a first input signal and can control the camera 121 to perform continuous shooting with predetermined continuous shooting speed irrespective of a value of the first input signal. And, the controller 180 can generate the video file using images corresponding to the first input signal among a plurality of images captured by the camera 121. And, the controller 180 can store the remaining images, which are not used for generating the video file, in the memory 170. The controller 180 displays a plurality of images 2240 captured by the camera 121 by one-time continuous shooting command on the display unit 151 according to a command for selecting the icon 222 and may be then able to display a plurality of images corresponding to continuous shooting speed according to the value of the first input signal in a manner of distinguishing a plurality of the images from other images (e.g., highlighting) among a plurality of the captured images 2240. A user can change/add/delete at least one or more images included in the video file using a plurality of the images 2240 shown in FIG. 22 (*b*).

Although FIG. 22 explains an example for a case of generating a video file in a manner of composing a plurality of images captured by continuous shooting, the example can be similarly applied to a case of displaying each of a plurality of the images on the display unit 151.

Figure 23:
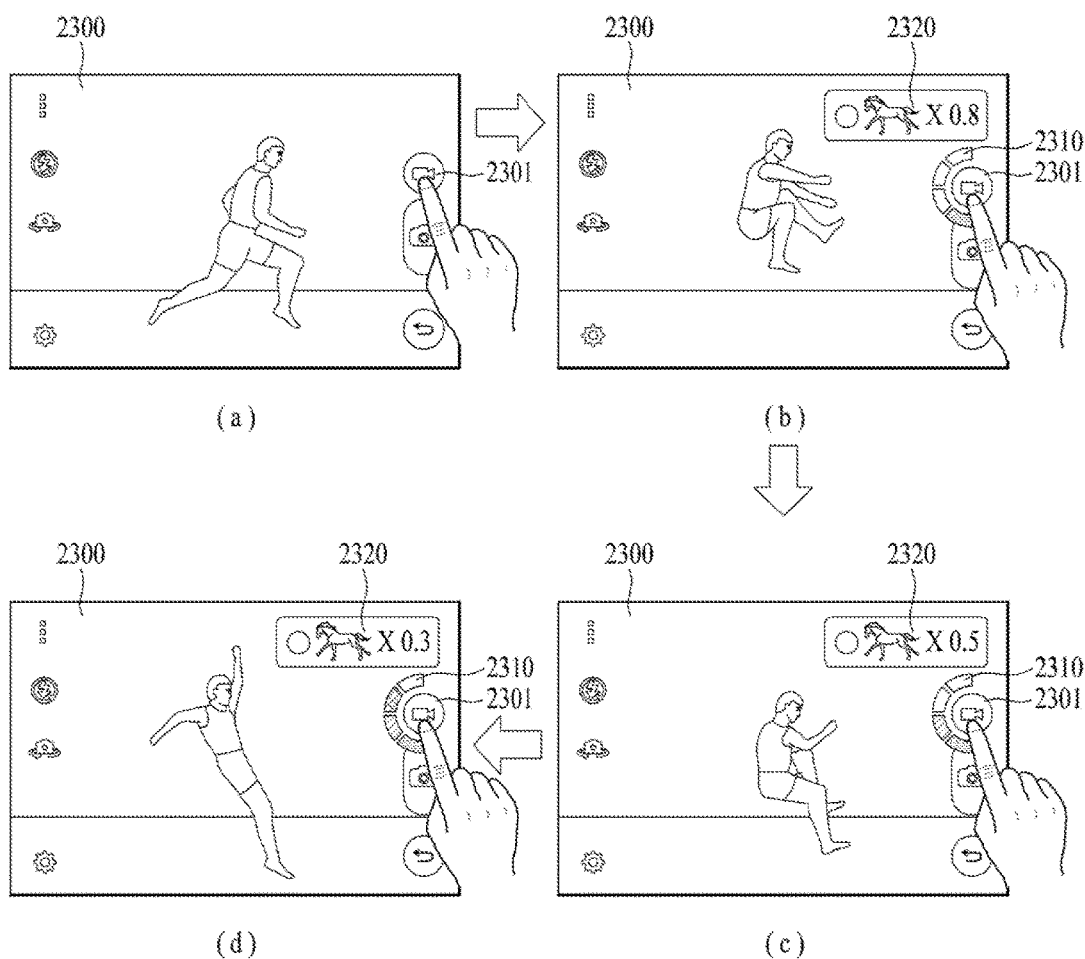
FIG. 23 is a diagram for explaining a different example of a method of controlling a predetermined function of a specific application according to a first input signal in a mobile terminal according to one embodiment of the present invention.

FIG. 23 is a diagram for explaining a different example of a method of controlling a predetermined function of a specific application according to a first input signal in a mobile terminal according to one embodiment of the present invention. In the present embodiment, assume that a specific application corresponds to a camera application and a predetermined function corresponds to a low speed video capturing function. In this case, the low speed capturing function is to play a captured video in a slow mode. When a video is captured, images of the number of frames (e.g., 240 frames/s) per one second, which is greater than the number of frames of a normal video, are captured and the captured images are played with a playback time interval of images included in a normal video file (e.g., each frame is played for 0.033 second). By doing so, effect of the slow mode can be implemented.

In the present embodiment, as the effect of the slow mode is getting bigger, the number of frames per second obtained by the camera 121 increases (i.e., continuous shooting speed becomes faster). As the effect of the slow mode is getting smaller, the number of frames per second obtained by the camera 121 may decrease (i.e., continuous shooting speed becomes slower).

Referring to FIG. 23 (a), the controller 180 of the mobile terminal 100 executes a camera application and can display a preview image 2300 captured by the camera 121 on the display unit 151. An icon 2301 corresponding to a video capturing command is displayed on the preview image 2300.

A user can touch the icon 2301 with prescribed pressure. The controller 180 can detect a first input signal touching the icon 2301. In this case, the first input signal may correspond to an input signal that at least one of the area of a region of the display unit 151 corresponding to the first input signal and pressure putting on the region of the display unit 151 corresponding to the first input signal is equal to or greater than a prescribed degree. Depending on an embodiment, the controller 180 can detect the first input signal by a command of touching a prescribed region rather than the icon 2301.

And, the controller 180 can control a low speed video capturing function of the camera application based on a value of the first input signal, i.e., a value of at least one of the area of the region of the display unit 151 corresponding to the first input signal and the pressure putting on the region of the display unit 151 corresponding to the first input signal.

Specifically, if a command for touching the icon 2301 is detected, the controller 180 starts to capture a video by controlling the camera 121. As a value of the first input signal increases, the controller can increase continuous shooting speed in a manner of increasing the effect of the slow mode (i.e., the number of captured frames per second increases). As the value of the first input signal decreases, the controller can decrease continuous shooting speed in a manner of decreasing the effect of the slow mode (i.e., the number of captured frames per second decreases). If the number of captured frames per second increases, since playback time between adjacent frames is constant, total playback time of a video file increases when the video file is played in the future. Hence, the effect of the slow mode increases.

A value of the continuous shooting speed corresponding to the value of the first input signal can be stored in the memory 170 in advance. And, if the first input signal is released, the controller 180 cancels the slow mode and may be able to control the camera 121 to capture a video with predetermined normal continuous shooting speed or stop capturing a video. The controller 180 can periodically sense the first input signal in every predetermined time interval while the value of the first input signal is changing.

In the present embodiment, assume that a user touches the icon 2301 with gradually increasing pressure for a predetermined time.

Referring to FIG. 23 (b) to (d), the controller 180 can display an indicator 2310 corresponding to the value of the first input signal on the display unit 151. The indicator 2310 may vary at least one selected from the group consisting of a size, a shape, color, and transparency of the indicator according to a change of the value of the first input signal. A user can intuitively recognize the value of the first input signal inputted by the user via the change of the indicator 2310. Besides the indicator 2310, the controller 180 can further provide auditory feedback, tactile feedback, visual feedback and the like corresponding to the value of the first input signal.

And, referring to FIG. 23 (b) to (d), the controller 180 can display a graphic data 1320 indicating a value corresponding to a low speed video capturing mode controlled according to the value of the first input signal. As an example, the graphic data 1320 may indicate continuous shooting speed or a degree of a slow mode, which is appeared when a video file is played, after the low speed video capturing is completed. FIG. 23 shows an example of the graphic data 1320 corresponding to the latter case.

Depending on an embodiment, FIG. 23 can also be applied to a case of playing a video file after video capturing is completed. In this case, a drawing identification number 2300 may indicate an image of a video file in playing. And, a user can play the video file in a slow mode or a fast mode by controlling pressure corresponding to the first input signal. Playing the video file in the slow mode means to increase playback interval between adjacent frames. Playing the video file in the fast mode means to decrease playback time of frames of same number. The controller 180 can control the playback mode of the video file according to the value of the first input signal.

Depending on an embodiment, the controller 180 can control the camera 121 to capture a video with predetermined continuous shooting speed irrespective of the value of the first input signal. As an example, the predetermined continuous shooting speed may correspond to maximum continuous shooting speed available in a video capturing mode according to performance of the camera 121. And, the controller 180 can generate a video file using a plurality of images corresponding to continuous shooting speed according to the value of the first input signal among a plurality of images captured with the predetermined continuous shooting speed. And, when the video file is played, a user can select a playback mode (slow/fast mode and a degree of the mode) and the controller 180 can regenerate a video file in accordance with the selected playback mode using a plurality of the captured images and play the video file.

Figure 24:
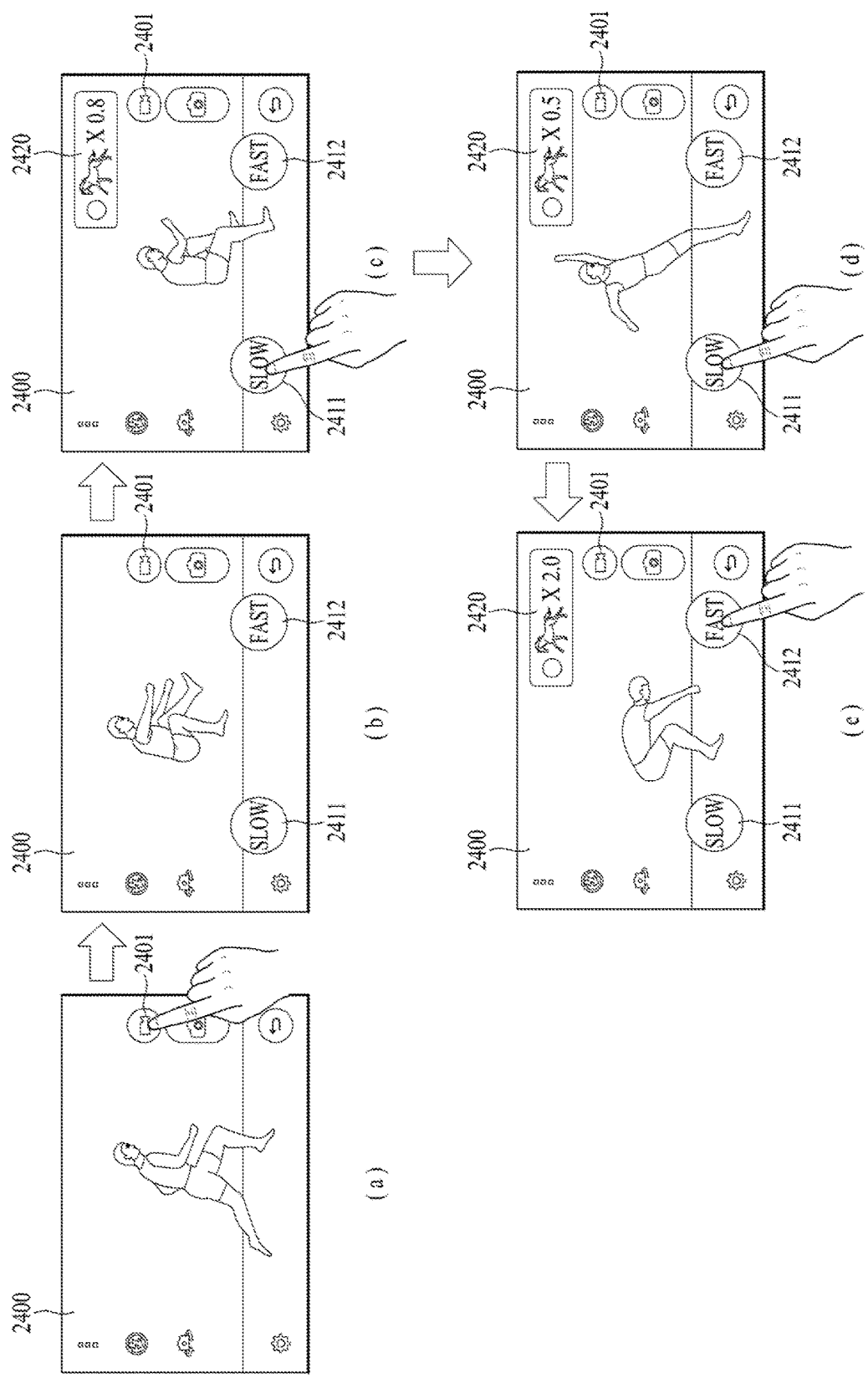
FIG. 24 is a diagram for explaining a further different example of a method of controlling a predetermined function of a specific application according to a first input signal in a mobile terminal according to one embodiment of the present invention.

FIG. 24 is a diagram for explaining a further different example of a method of controlling a predetermined function of a specific application according to a first input signal in a mobile terminal according to one embodiment of the present invention. In the present embodiment, assume that a specific application corresponds to a camera application and a predetermined function corresponds to a low speed video capturing function. Detail explanation on contents overlapped with what is mentioned earlier with reference to FIG. 23 is omitted at this time.

Referring to FIG. 24 (a), the controller 180 of the mobile terminal 100 executes a camera application and can display a preview image 2400 captured by the camera 121 on the display unit 151. An icon 2401 corresponding to a video capturing command is displayed on the preview image 2400.

The controller 180 controls the camera 121 to capture a video according to a command for touching the icon 2401.

Referring to FIG. 24 (b), if video capturing starts, the controller 180 can display a first icon 2411 and a second icon 2412 for controlling a value (e.g., continuous shooting speed) corresponding to a slow video capturing function of a camera application on the display unit 151. As an example, the first icon 2411 corresponds to a function of increasing continuous shooting speed by increasing a slow effect of a slow capturing mode and the second icon 2412 corresponds to a function of decreasing the continuous shooting speed by decreasing the slow effect of the slow capturing mode.

Referring to FIGS. 24 (c) and (d), assume that a user touches the first icon 2411 with gradually increasing pressure after video capturing is started.

The controller 180 can detect a first input signal via the first icon 2411. If a value (a value of at least one of the area of a region of the display unit 151 corresponding to the first input signal and pressure putting on the region corresponding to the first input signal) of the first input signal received via the first icon 2411 increases, the controller 180 can increase continuous shooting speed (the number of captured frames per 1 second) when the video is captured. In this case, the continuous shooting speed may be irrelevant with release of the first input signal and decrease of the value of the first input signal received via the first icon 2411.

And, the controller 180 can display a graphic data 2420 indicating a value corresponding to a low speed video capturing mode controlled according to the value of the first input signal on the display unit 151.

Meanwhile, referring to FIGS. 24 (d) and (e), assume that a user releases a touch of the first icon 2411 and touches the second icon 2412.

The controller 180 can detect a first input signal via the second icon 2412. If a value (a value of at least one of the area of a region of the display unit 151 corresponding to the first input signal and pressure putting on the region corresponding to the first input signal) of the first input signal received via the second icon 2412 increases, the controller 180 can decrease continuous shooting speed (the number of captured frames per 1 second) when the video is captured. In this case, the continuous shooting speed may be irrelevant with release of the first input signal and decrease of the value of the first input signal received via the second icon 2412.

And, the controller 180 can display a graphic data 2420 indicating a value corresponding to a low speed video capturing mode controlled according to the value of the first input signal on the display unit 151.

According to the present embodiment, a user can control an effect of a slow mode when a video file is played in the future.

FIG. 25 is a diagram for explaining a further different example of a method of controlling a predetermined function of a specific application according to a first input signal in a mobile terminal according to one embodiment of the present invention. In the present embodiment, assume that the specific application corresponds to a camera application and the predetermined function corresponds to a function of controlling depth of field.

Referring to FIG. 25 (a), the controller 180 of the mobile terminal 100 executes a camera application and can display a preview image 2500 captured by the camera 121 on the display unit 151.

A user can touch a prescribed region of the preview image 2500 with prescribed pressure. The controller 180 can detect a first input signal touching a region of the preview image 2500. In this case, the first input signal may correspond to an input signal that at least one of the area of a region of the display unit 151 corresponding to the first input signal and pressure putting on the region of the display unit 151 corresponding to the first input signal is equal to or greater than a predetermined degree.

And, the controller 180 can control depth of field based on at least one of the area of the region of the display unit 151 corresponding to a value of the first input signal, i.e., the first input signal and the pressure putting on the region of the display unit 151 corresponding to the first input signal.

Specifically, as the value of the first input signal increases, the controller 180 can widen a focused area (depth become deeper) by increasing a value of an aperture. As the value of the first input signal decreases, the controller 180 can narrow a focused area (depth become narrower) by decreasing the value of the aperture. If depth of field becomes deeper, it may be able to focus on a region located at a long distance.

If depth of field becomes narrower, it may focus on a region located at a short distance only and it may be unable to focus on the region located at the long distance.

In the present embodiment, assume that a user has touched a prescribed region of the display unit 151 with gradually increasing pressure for prescribed time. Referring to FIG. 25 (a) to (c), the controller 180 can gradually expand a focused area in a manner of increasing a value of an aperture.

FIG. 26 is a diagram for explaining a further different example of a method of controlling a predetermined function of a specific application according to a first input signal in a mobile terminal according to one embodiment of the present invention. In the present embodiment, assume that the specific application corresponds to a camera application and the predetermined function corresponds to a timer setting function. In this case, the timer setting function may correspond to a function of enabling capturing an image to be started after predetermined time elapses in case that a timer is configured and a capturing command is detected.

Referring to FIG. 26 (a), the controller 180 of the mobile terminal 100 executes a camera application and can display a preview image 2600 captured by the camera 121 on the display unit 151.

A user can touch a prescribed region of the preview image 2600 with prescribed pressure. The controller 180 can detect a first input signal touching a region of the preview image 2600. In this case, the first input signal may correspond to an input signal that at least one of the area of a region of the display unit 151 corresponding to the first input signal and pressure putting on the region of the display unit 151 corresponding to the first input signal is equal to or greater than a predetermined degree.

And, the controller 180 can control depth of field based on at least one of the area of the region of the display unit 151 corresponding to a value of the first input signal, i.e., the first input signal and the pressure putting on the region of the display unit 151 corresponding to the first input signal.

Specifically, as the value of the first input signal increases, the controller 180 increases timer setting time. As the value of the first input signal decreases, the controller 180 can decrease the timer setting time.

In the present embodiment, assume that a user has touched a prescribed region of the display unit 151 with gradually increasing pressure in FIG. 26 (a) to (b) and the user has released the touch in FIG. (c).

Referring to FIGS. 26 (a) and (b), the controller 180 increases timer setting time according to the value of the first input signal and can display an indicator 2610 corresponding to the value of the first input signal on the display unit 151. A user can intuitively recognize a degree of the timer setting time corresponding to the first input signal inputted by the user.

Referring to FIG. 26 (c), the controller 180 detects a release of the first input signal and can set a timer by time corresponding to a value of the first input signal immediately before the first input signal is released. And, if the first input signal is released, the controller 180 inversely calculates the set timer time and may be able to control the camera 121 to start capturing when the set timer time elapses.

According to the aforementioned embodiments of the present invention, it is able to provide a mobile terminal capable of controlling a function of a specific application according to pressure corresponding to an input signal of a user. And, it is able to provide a mobile terminal capable of providing feedback to enable a user to know a degree of pressure corresponding to an input signal of a user.

The present invention mentioned in the foregoing description may be implemented using a machine-readable medium having instructions stored thereon for execution by a processor to perform various methods presented herein. Examples of possible machine-readable mediums include an HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a camera;
   a display unit that receives a touch input from a user;
   a sensing unit, including one or more of a touch sensor and a pressure sensor, that senses the touch input; and
   a controller, electrically connected to the sensing unit and the display unit, that displays, via the display unit, an execution screen of a first application detects a first input signal generated based on the touch input received via the display unit in a state where the execution screen of the first application is displayed, wherein the first application is a camera application, and
   controls a predetermined function of the first application according to a change in value of the first input signal, wherein the predetermined function is a continuous shooting function and the value of the predetermined function is the speed of the continuous shooting function,
   wherein the value of the first input signal is determined based on one or more of a touch area on the display unit corresponding to the touch input and a pressure associated with the touch input applied to the touch area.

2. The mobile terminal of claim 1, wherein the touch sensor is included in the display unit as a part of the sensing unit to sense the touch input, and wherein the controller displays, on the display unit, an indicator corresponding to the value of the first input signal.

3. The mobile terminal of claim 1, wherein if the value of the first input signal increases, the controller increases a value of the predetermined function, and wherein if the value of the first input signal decreases, the controller decreases the value of the predetermined function.

4. The mobile terminal of claim 3, wherein the controller displays, on the display unit, a graphic data corresponding to the value of the predetermined function.

5. The mobile terminal of claim 3, further comprising a haptic module, wherein the controller outputs, via the haptic module, vibration data corresponding to the value of the predetermined function.

6. The mobile terminal of claim 3, further comprising an audio output module,
   wherein the controller outputs, via the audio output module, audio data corresponding to the value of the predetermined function.

7. The mobile terminal of claim 1, wherein if the value of the first input signal exceeds a predetermined degree, the controller switches a capturing mode to a video capturing mode from a still image capturing mode.

8. The mobile terminal of claim 7, wherein the controller outputs a message indicating that the capturing mode is switched to the video capturing mode on the display unit.

9. The mobile terminal of claim 7, wherein the controller generates a single video file using a plurality of images captured in the still image capturing mode and a plurality of images captured in the video capturing mode.

10. The mobile terminal of claim 1, wherein the first input signal is periodically detected on a time interval basis as the value of the first input signal changes.

11. The mobile terminal of claim 1, wherein if a second touch input is received in the area of the display unit corresponding to the first input signal and the pressure associated with the second touch input is equal to or greater than a first degree, the controller generates the first input signal based on the second touch input and controls the predetermined function based on the generated first input signal.

12. The mobile terminal of claim 11, wherein the controller displays, on the display unit, a GUI for controlling a value of the predetermined function, wherein if a specific value is selected via the GUI, the controller regenerates the first input signal corresponding to the selected specific value to control the predetermined function based on the regenerated first input signal.

13. The mobile terminal of claim 1, wherein if the predetermined function is executed according to the first input signal, the controller displays, on the display unit, a first indicator corresponding to an increase in a value of the predetermined function and a second indicator corresponding to a decrease in the value of the predetermined function, increases the value of the predetermined function according to an input signal received via the first indicator and decreases the value of the predetermined function according to an input signal received via the second indicator.

14. The mobile terminal of claim 13, wherein the controller determines the value of the predetermined function according to a count of receiving the input signal received via the first indicator and the second indicator.

15. The mobile terminal of claim 13, wherein the controller determines the value of the predetermined function based on one or more of the touch area of on display unit and the pressure applied to the touch area corresponding to the input signal received via the first indicator and the second indicator, and wherein a release of the input signal received via the first indicator and the second indicator, a decrease in the touch area of the display unit corresponding to the input signal received via the first indicator and the second indicator and a decrease of the pressure applied to the touch area corresponding to the input signal received via the first indicator and the second indicator are irrelevant with the value of the predetermined function.

* * * * *